United States Patent
Yanagihara et al.

(10) Patent No.: US 8,836,573 B2
(45) Date of Patent: Sep. 16, 2014

(54) SUBMILLIMETER RADAR USING PHASE INFORMATION

(75) Inventors: Hiromichi Yanagihara, Fukuoka (JP); Mineki Soga, Nisshin (JP); Harald Franz Arno Merkel, Lindome (SE)

(73) Assignee: Toyota Motor Europe NV/SA, Brussels (BE)

( * ) Notice: Subject to any disclaimer, the term of this patent is extended or adjusted under 35 U.S.C. 154(b) by 251 days.

(21) Appl. No.: 13/202,021

(22) PCT Filed: Oct. 21, 2010

(86) PCT No.: PCT/EP2010/065903
§ 371 (c)(1),
(2), (4) Date: Aug. 17, 2011

(87) PCT Pub. No.: WO2011/048192
PCT Pub. Date: Apr. 28, 2011

(65) Prior Publication Data
US 2011/0304498 A1     Dec. 15, 2011

(30) Foreign Application Priority Data
Oct. 22, 2009  (EP) .................................. 09173713

(51) Int. Cl.
| | |
|---|---|
| G01S 13/88 | (2006.01) |
| G01S 7/41 | (2006.01) |
| G01S 13/89 | (2006.01) |
| G01S 13/87 | (2006.01) |

(52) U.S. Cl.
CPC .............. *G01S 13/87* (2013.01); *G01S 7/414* (2013.01); *G01S 13/89* (2013.01); *G01S 7/412* (2013.01)
USPC .............. 342/90; 342/22; 342/27; 342/179

(58) Field of Classification Search
CPC ....... G01S 13/89; G01S 7/411; G01S 13/887; G01S 7/414; G01S 7/41
USPC ....................... 342/22, 27, 90, 179
See application file for complete search history.

(56) References Cited

U.S. PATENT DOCUMENTS

| | | | |
|---|---|---|---|
| 6,815,683 B2 | 11/2004 | Federici et al. | |
| 8,144,052 B2 * | 3/2012 | Cooper et al. | ................ 342/179 |

(Continued)

FOREIGN PATENT DOCUMENTS

| | | |
|---|---|---|
| JP | H7-72248 A | 3/1995 |
| JP | H8-320254 A | 3/1996 |

(Continued)

OTHER PUBLICATIONS

International Search Report PCT/EP2010/065903 dated Feb. 4, 2011.

(Continued)

*Primary Examiner* — John B Sotomayor
(74) *Attorney, Agent, or Firm* — Sughrue Mion, PLLC

(57) ABSTRACT

A signal processor (30) for a submillimeter wavelength active radar system (10, 20, 30) processes signals received and downconverted by the radar system, the downconverted signals corresponding to a given pixel of the field of view having time varying amplitude and phase components which have a periodic component which is dependent on content. Information about the content is discriminated from the periodic component. By using phase rather than only amplitude, there is additional information in the downconverted signals. The phase is more sensitive to changes in the content such as objects, background and atmospheric conditions, than amplitude alone. The phase information enables the periodic component to be retained which can be characteristic of the content owing to content flutter, changes in submillimeter standing waves and interference fringes in received reflections of submillimeter illumination if surface layers have a thickness of a number of half wavelengths.

13 Claims, 16 Drawing Sheets

(56) References Cited

U.S. PATENT DOCUMENTS

| | | | |
|---|---|---|---|
| 8,477,063 B2* | 7/2013 | Meyers et al. | 342/90 |
| 8,547,274 B2* | 10/2013 | Reinpoldt, III | 342/22 |
| 2004/0065831 A1 | 4/2004 | Federici et al. | |
| 2006/0273255 A1* | 12/2006 | Volkov et al. | 250/336.1 |
| 2007/0120731 A1* | 5/2007 | Kelly et al. | 342/159 |
| 2008/0174476 A1 | 7/2008 | Detlefsen et al. | |
| 2008/0304044 A1 | 12/2008 | Cooper et al. | |
| 2009/0065696 A1 | 3/2009 | Mann et al. | |
| 2010/0090887 A1* | 4/2010 | Cooper et al. | 342/25 F |
| 2011/0298652 A1* | 12/2011 | Yanagihara et al. | 342/146 |
| 2011/0304498 A1* | 12/2011 | Yanagihara et al. | 342/70 |

FOREIGN PATENT DOCUMENTS

| | | | |
|---|---|---|---|
| JP | 2002-257932 A | | 9/2002 |
| JP | 2006-81771 A | | 3/2006 |
| JP | 2006/508333 A | | 3/2006 |
| JP | 2006-107457 A | | 4/2006 |
| JP | 2008-39422 A | | 2/2008 |
| JP | 2008-48243 A | | 2/2008 |
| JP | 2009-526988 A | | 7/2009 |
| JP | 2011080860 A | * | 4/2011 |
| WO | 03/102518 A2 | | 12/2003 |
| WO | 2006/078570 A2 | | 7/2006 |
| WO | 2007/093814 A1 | | 8/2007 |

OTHER PUBLICATIONS

Melnikov, Valery, "Aspect ratios and flutter angles of ice cloud particles retrieved from polarimetric radar data", ERAD 2012-The Seventh European Conference on Radar in Meteorology and Hydrology, Cooperative Institute for Mesoscale Meteorological Studies of the University of Oklahoma, Norman, OK, USA.

Willis, Nicholas J. and Griffiths, Hugh D., "Advances in Bistatic Radar", 2007 SciTech Publishing Inc., Raleigh, NC.

Ferranti, Richard L., "Widgets and Wonders: Lincoln Laboratory's Unique Radar Hardware Legacy", Lincoln Laboratory Journal, Nov. 2, 2000, vol. 12, No. 2.

Billingsley, Barrie J., Low-Angle Radar Land Clutter, Measurements and Empirical Models, Lincoln Laboratory Massachusetts Institute of Technology, 2002 William Andrew Publishing, Norwich, NY.

Notice of Reasons for Rejection corresponding to JP 2012-534704 dated Feb. 18, 2014.

* cited by examiner

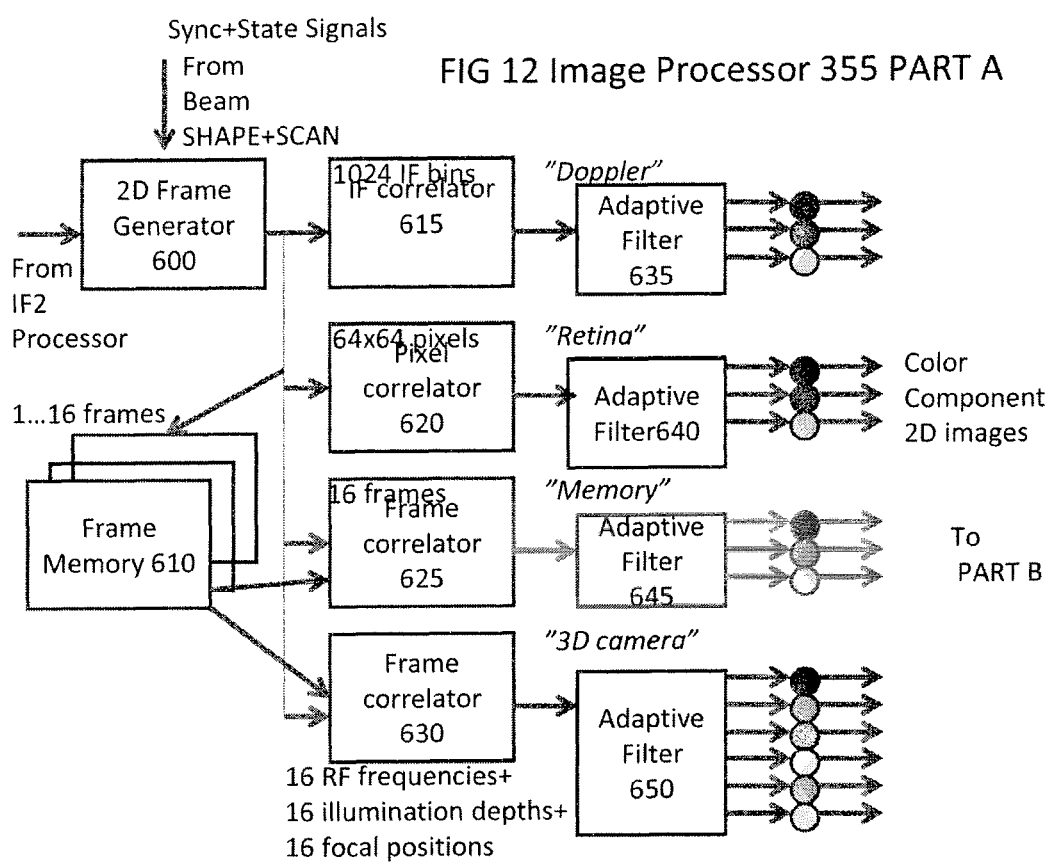

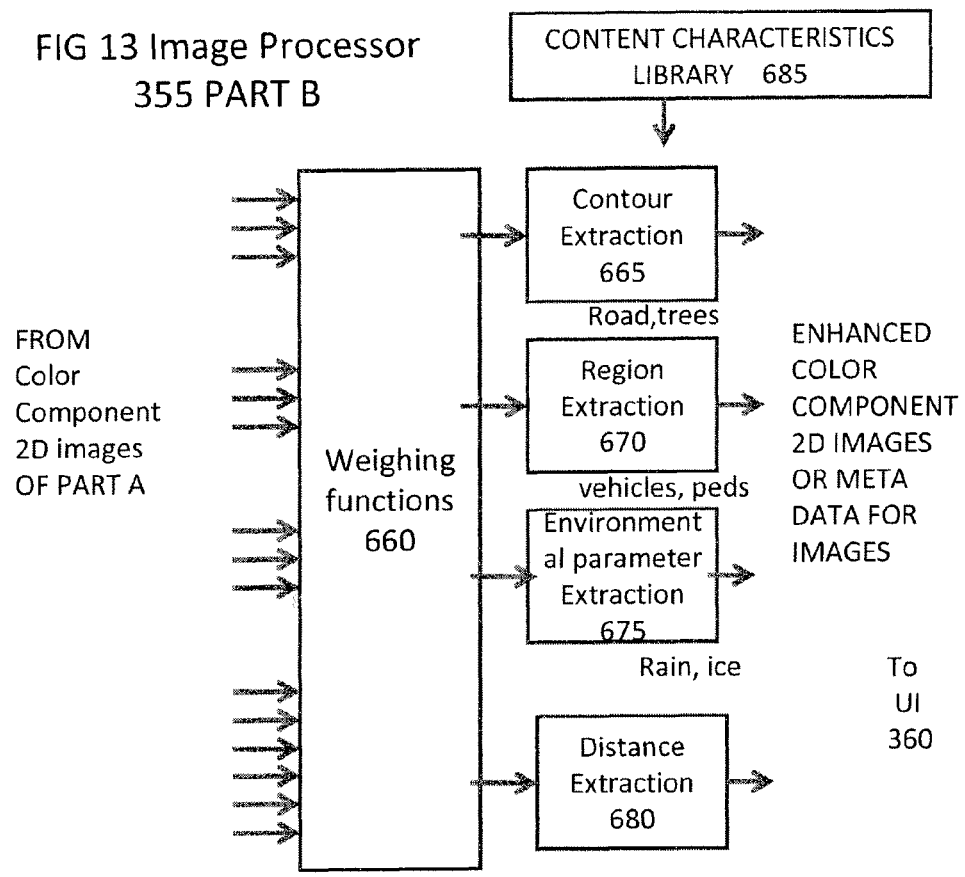
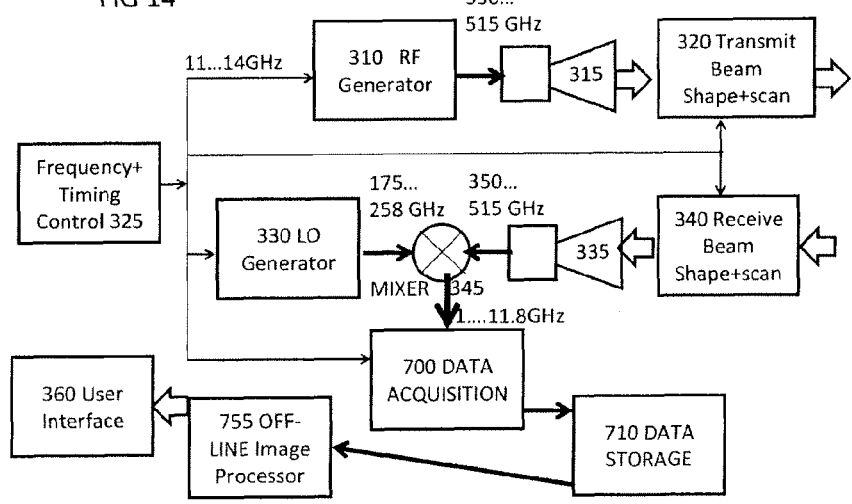

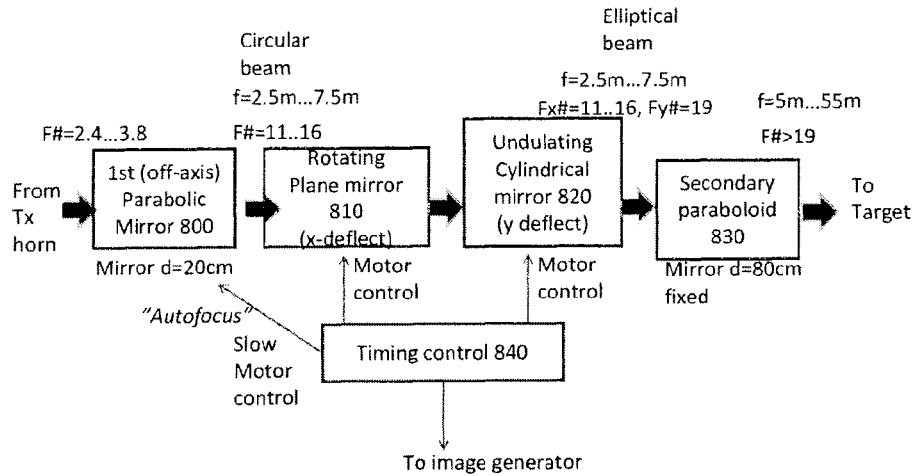
FIG 15 Transmit Beam Scanner
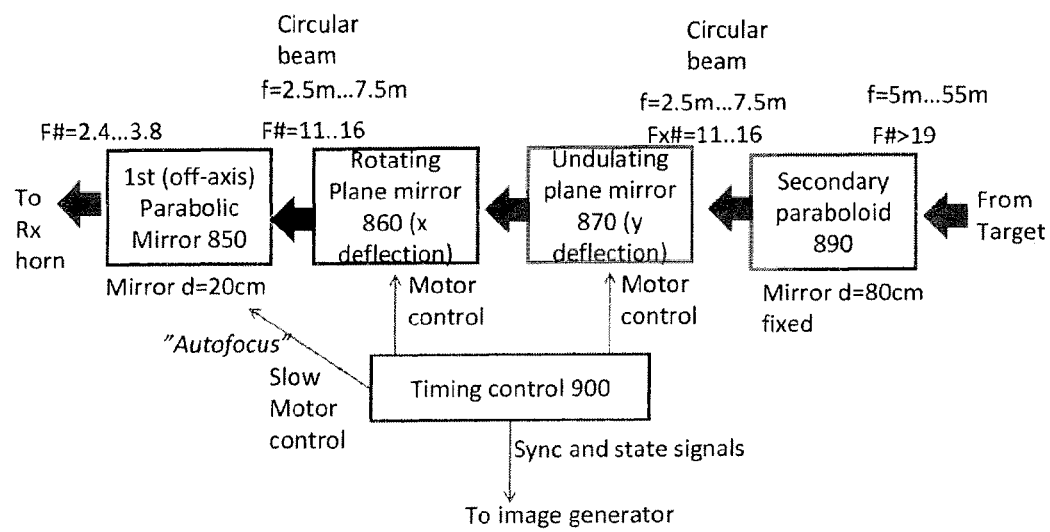
FIG 16 Receive Beam Scanner

SUBMILLIMETER RADAR USING PHASE INFORMATION

CROSS REFERENCE TO RELATED APPLICATIONS

This application is a National Stage of International Application No. PCT/EP2010/065903, filed on Oct. 21, 2010, which claims priority from European Patent Application No. 09173713.0, filed on Oct. 22, 2009, the contents of all of which are incorporated herein by reference in their entirety.

FIELD OF THE INVENTION

This invention relates to signal processors for submillimeter radar systems, to such radar systems, to robots or vehicles such as road vehicles having such systems, and to corresponding methods and computer programs.

DESCRIPTION OF THE RELATED ART

Discrimination between different types of objects in submillimeter—wavelength radars currently relies solely on measuring the radar cross section—i.e. the fraction of wave power reflected by a square reference unit of a certain object. Due to a correlation of e.g. the surface roughness and absorption properties of the object, all points of the object will exhibit similar radar cross section values. Grouping similar measurement results to contours yields a discrimination tool to separate the object from the background. Submillimeter radars for outdoors applications are confronted with complex objects in front of complex backgrounds or behind complex foregrounds. Typical classical microwave radar applications (e.g. ground-aircraft and aircraft-aircraft radar) do not encounter this type of problem since the background is formed by the sky which is essentially a diffuse and low loss absorber. The only "sharp" radar cross sections measured are created by aircraft as objects. In addition the only measurable Doppler shift signal comes from other aircrafts and from angles where the radar beam hits ground. Among ground return signals low flying aircraft will remain undetected.

Microwave radars are generally not suitable for imaging applications requiring classification and qualification of the target under complex environments. Several technologies have been proposed and demonstrated to allow measurement at least under medium complex environments. An example is iceberg detection using naval microwave radars. Here the tiny reflection of an iceberg (where only a small fraction is found above the waterline) has to be discriminated from the much larger reflection caused by waves. Time of flight filtering is used that allows determination of the distance from radar to target using e.g. frequency modulated continuous wave (FMCW) radars or chirped pulsed radars. In addition one has to analyze the spatial frequency contents of the signal persistence (icebergs move much slower than the embedding waves). Naval radars are (by the structure of the environment) more or less one-dimensional since most of the detection area is found in a tiny band below the horizon line which greatly reduces the amount of data to be processed.

Road vehicle, e.g. car radars at lower frequencies (for example 63 GHz vehicle to infrastructure, 66 GHz vehicle to vehicle, 77 GHz cruise control, and 79 GHz anti collision) use either pulsed radar scheme or the above FMCW technology to discriminate objects at various distances. These radars do not produce images of sufficient resolution to allow discrimination of objects by form. These radar systems provide a reasonable horizontal resolution but generally very limited vertical resolution. There are infrared cameras providing high resolution both vertically and horizontally. Such cameras are sensitive to the total power (incoherent) absorbed by a pixel receiver and cannot gain distance information as in the case of a radar system. In addition most IR camera systems for automotive applications are passive. No signal is sent out and the present illumination of the scenario or the object's own emission is used as signal source. Therefore IR camera systems have to cope with low contrast scenarios (a person standing in front of a warm background) and are sensitive to strong IR sources (lamps, sun) blinding the system. In addition, rain and snow effectively reduce the system's performance.

Submillimeter-wave radar for outdoors applications must operate within specified, distinct, frequency bands. These bands are characterized by the absence (or at least comparable weakness) of atmospheric damping. In contrast to microwave radar applications, where the complete frequency range from 0 to 100 GHz can be used and only legal restrictions limit the frequency optimization, radars above 100 GHz can only use a small (20%) part of the frequency range available. Typical bands (also referred to as "atmospheric windows") are located around 100 GHz, 220 GHz, 350 GHz, 450 GHz, 520 GHz, 600 GHz, 810 GHz, 1.000 THz, 1.650 THz and 2.400 THz with increasing peak damping. These windows are known.

It is known from WO2006/078570 (HOLT) at paragraphs 0063-0069 to provide a method of surveillance of a subject including irradiating at least a portion of the subject with electromagnetic radiation in first and second different frequency ranges having frequencies that are more than about 100 MHz and less than about 2 THz.

It is stated that in order to enhance the observation of differences in the images, each image may be assigned a distinguishing characteristic, such as an image pattern, intensity level or color. The images are grayscale images derived from color images. In the example cited, the pixels in these images were assigned the colors of red, green and blue, respectively. This is at least part of the reason that the general intensity levels of these images differ.

It is stated further that the different images produced from data for different frequency ranges may be displayed serially or concurrently to an observer, to assist the observer in identifying differences between the images. The areas of such differences may correspond to image anomalies, which may include objects. Directing an observer's attention to the anomalies may hasten the identification of objects.

SUMMARY OF THE INVENTION

An object of the invention is to provide alternative signal processors for submillimeter radar systems, such radar systems, robots, or vehicles such as robotic vehicles or road vehicles having such systems, and to corresponding methods and computer programs. According to a first aspect, the invention provides:

A signal processor for a submillimeter wavelength active radar system having a field of view, the signal processor being arranged to process signals received from the field of view and downconverted by the radar system, the downconverted signals corresponding to a given pixel of the field of view having time varying amplitude and phase components which have a periodic component which is dependent on content at the given pixel of the field of view, and the signal processor being arranged to discriminate information about the content from the periodic component.

By using phase rather than only amplitude, there is additional information in the downconverted signals which is lost in a conventional non coherent system as being indistinguishable from noise. The phase is more sensitive to changes in the content such as objects, background and atmospheric conditions, than amplitude alone. The phase information enables the periodic component to be retained which can contain at least three types of information characteristic of the content. Firstly flutter of content in the form of quasi periodic changes of content over a small number of submillimeter wavelengths can be characteristic of particular content such as micromovements, e.g. vegetation moving in wind, or other forced vibration of any structure. Secondly, changes in submillimeter standing waves can be detected as speckle, which instead of being discarded as noise, can now be detected well enough to determine differences in the speckle caused by differences in the content. Thirdly, thin layers on the objects in the field of view can cause interference fringes that influence received reflections of submillimeter illumination if the layers have a thickness in the order of a number of half wavelengths. An example is a layer of ice on a road. This additional information can make active submillimeter radars more practical for a wide variety of applications including for example automotive radar which must be immune to blinding by sunlight, fog or precipitation.

Embodiments of the invention can have any other features added, some such additional features are set out in dependent claims and described in more detail below.

In some embodiments, the downconverted signals can be IF signals having an IF spectrum, and the signal processor be arranged to analyse two or more regions of the IF spectrum separately. This can help enable discrimination of content which preferably appears in some parts of the spectrum and not in others for example.

The received signals can comprise signals at a plurality of different submillimeter frequencies, and the signal processor be arranged to analyse the corresponding IF signals for the different submillimeter frequencies separately. Again this can help discriminate content which appears at some submillimeter frequencies and not others. The signal processor can be arranged to carry out any of the techniques known for image analysis such as application of digital filters such as smoothing filters or filters used for segmentation, contour generation, identification of contrast jumps and/or lines or and/edges, and/or corners, and may be adapted to use morphological operators to improve or smooth contours, regions etc. The signal processor can be arranged to classify detected objects and/or points of interest in the images, e.g. contrast jumps, lines. The signal processor may be adapted to cluster parts of the received images to thereby identify regions having a common characteristic, e.g. to thereby identify objects. This can involve for example comparison of detected characteristics to a stored library of characteristics of given objects or classes of objects.

The signal processor can have a part for relating parts of the received signal to a corresponding set of receive beam positions. This can enable grouping of the related signals into a frame representative of the scene. This can be a one, two or three dimensional framing for example.

The signal processor can have a part for applying operators to the framed data. The operator can be an operator for extracting a local change of amplitude and/or IF frequency within the scene at a given moment in time.

The operator can be an operator for extracting spatial or temporal characteristics in the framed data. The operator can be an operator for extracting features having a dependency on sub millimeter frequency or amplitude, or having dependency on any of illumination orientation, focal position of the receiver, or polarization, or any combination of these.

Another aspect provides a sub millimeter radar system having a transmitter for illuminating a field of view, a receiver for receiving signals from the field of view, a demodulator, the demodulator using a local oscillator signal being phase locked to the transmitter, and the system having the signal processor set out above.

Other aspects can provide a corresponding method of using an active radar system using a transmitter, and receiving and processing signals from the field of view, and a corresponding method of processing signals.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 12 and 13 show schematic views of image processing parts for the same system embodiments, FIG. 14 shows a schematic view of an alternative embodiment using off-line I.F. processing and image processing, FIGS. 15 and 16 show schematic views of beam shape and scan parts for embodiments of the radar system.

DESCRIPTION OF THE PREFERRED EMBODIMENTS

Figure 1:
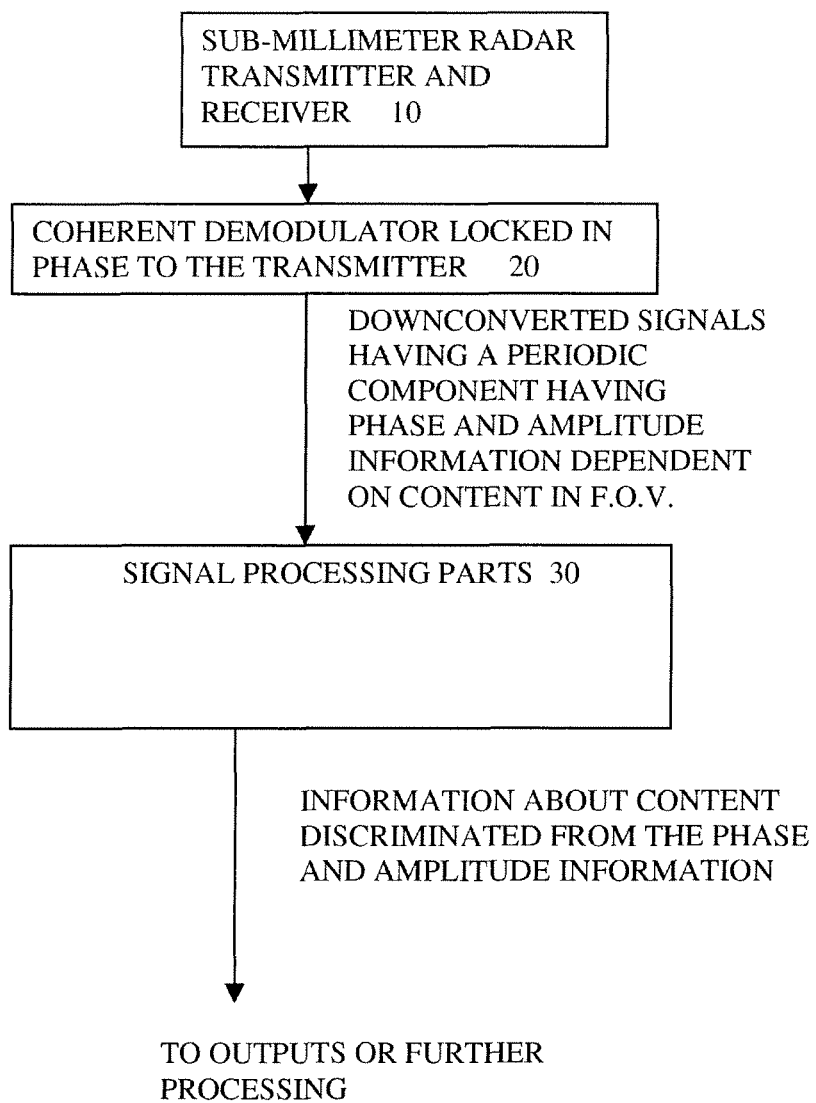
FIGS. 1 and 2 show schematic views of embodiments of radar systems according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

"Active" means any radar system which emits radiation to illuminate a scene and detect radiation reflected from the scene. The emitter can in principle be independent of the receiving part, if the receiving can be phase locked to the emitter, by detecting the emissions. This is contrasted by "passive" which means any radiometric system using either broadband sources to illuminate the targets (either man made or not) or the target's self-emission. Such systems are considered as "passive" radars by a person skilled to the art.

Submillimeter radar is intended to encompass generally any radar using frequencies above about 100 GHz, and examples will be described within a narrower range above 300 GHz and below 3 THz, also known as Teraherz radars. Such radars can be applied in for example systems for vehicles, and security or surveillance systems in buildings for example as is known.

Content is defined as anything in the field of view, including for example objects which are to be detected, such as cars or pedestrians for automotive applications and background or obscuring objects such as vegetation or buildings which at least for automotive applications are regarded as clutter and may be deleted from images as part of the discrimination. The content can also include atmospheric effects such as rain, fog, snow or sunlight affecting either or both of the outward illumination and the reflections returning to the receiver.

"Vehicle" should be interpreted broadly and refers to any robot, robotic vehicle, self-guided vehicle, road vehicle, ship, aircraft, etc.

Introduction to the Embodiments: Challenges and System Considerations

Submillimeter-wave (hereinafter submillimeter) radars for outdoors applications are confronted with complex objects in front of complex backgrounds like no other radar system. Therefore new technologies are needed to enhance the radar's discrimination and classification capability without excessive bandwidth and power requirements.

Reducing RF Bandwidth is one useful way to improve noise performance. Classical Doppler and FMCW radar systems require quite a large RF bandwidth to reach the required velocity respectively roundtrip distance resolution. The only available way to reach acceptable signal to noise ratios is integration. As a consequence only a small number of measurements can be performed per time unit. Usually this number is enough for 1D scanning radar. Imaging radar systems cannot be implemented based on these traditional methods due to the required number of pixel measurements. There must be ways to reduce the required RF bandwidth and providing the classification information by other ways. This reduction of bandwidth yields a much better signal to noise ratio. This increased signal to noise ratio can either be used to lower the LO power requirements or to increase the number of pixels (frames) measured per time unit.

LO Power is another limiting factor in constructing submillimeter imaging radars today is the availability of RF power to illuminate the scenario at a given distance. Currently output powers of 10 µW are state of the art using waveguide blocks. For a reasonable radar system, output powers of 10 mW must be achieved. Adding the requirement of a broadband illumination, the emission power goals are even more difficult to reach. A way to reach reasonable output power is to depart from broadband sources and to construct multi frequency sources that are able to emit the required power in the require frequency bands but are not necessary capable to generate high power levels in the frequency range in between the atmospheric windows.

Since active submillimeter radars are usually sensitive to reflective surfaces in or close to angles of specular reflection, the form of objects "seen" in submillimeter frequencies is inherently different from the images acquired using IR cameras. The images are also different from imagery obtained using passive millimeterwave radar under outdoors conditions where the essentially cold sky provides a large image contrast to the warm ground. Using a passive submillimeter radar at frequencies above 200 GHz, one finds that the sky temperature is close to the ground temperature resulting in a reduction of image contrast towards indoors conditions. An image of a face in an active submillimeter radar consists essentially only of a bright reflection of the nosetip, the forehead and the chin. There is no requirement to consider indoors and outdoors condition differently since the radar system provides the illumination. The remaining parts of the face do not contribute to the image since they are not in the angular region of specular reflection, and there is very little diffuse reflection, unlike optical frequencies. Another factor limiting the contribution of diffuse reflection to the image is the limited dynamic range of the receiver. Therefore shapes of objects do not correspond to recognisable shapes in optical images and so further analysis is needed to add another degree of information for classifying objects: Knowing that almost all points of a face will move at the same pace, the RF speckle pattern frequency spectrum will be identical even though the absolute signal level is low.

An object classification library can be a useful part of the discriminating process. With a multi frequency radar system at hand, a library of object behavior must be set up beforehand. There not only the spectral behavior of the object (with respect to RF frequency) but also the low frequency correlation length (measured in the IF band) can be listed in order to discriminate various object classes.

In addition, the object classification library can also contain information on the spatial and temporal correlation functions of the object. Certain objects have typical sizes and forms on the imager (spatial correlation length) and a typical time of visibility (correlation time) as well as relative motions of the object's parts with respect to each other (object autocorrelation spectra).

In contrast to conventional radar systems, submillimeter automotive radars can be used as imaging systems. Therefore a set of new concepts can be developed: Imaging radars need a high pixel repetition rate and a small integration time on each pixel. Therefore and together with the higher spatial resolution obtained due to the smaller wavelength, speckle signatures caused by tiny movements of the object and the background become visible in the amplitude information of the IF signals. They appear as noise unless phase information is maintained and detected. Some conditions are as follows:

the spatial resolution must be of the order of the object moving (leaf, clothing, vehicle part)
the wavelength must be small enough that a movement of such a complex object leads to a significant change of the phase information.

Both cases can be fulfilled for submillimeter radars, unlike other types of radar. Spatial resolutions of several centimeters allow individual leaves, clothing parts and vehicle parts to be discerned. The wavelength of typically less than a millimeter will result in tiny movements of the order of fractions of millimeters becoming visible as shifting standing wave ratios i.e. classical speckle patterns.

Instead of filtering out these periodic components such as speckle patterns, their frequency contents can be evaluated. Due to the typical frequency range of microscopic movements of the investigated objects leads to availability of micro-motion spectra that are distinct from object class to object class.

Leaves have typically an oscillation spectrum of several mm/s leading to speckle frequencies of 10 s to 100 Hz. Clothing has an oscillation spectrum of a few mm/s resulting in sub Hz spectra. Conventional radar systems have a frame rate of some 10 Hz and cannot see these speckle patterns. Taking a series of measurements on selected pixels over a time window allows a frequency resolution up to several kHz. Taking several pixel readouts and performing a FFT analysis or some other transform, can enable removal of some clutter such as vegetation influence for an automotive example. As will be explained in more detail below, more can be done. Correlation analysis can add two more dimensions to the 2D image obtained with a single frequency radar.

One can calculate the correlation time of any given pixel "back in time" and calculate the correlation length of any neighboring pixels "at the same time". The full power of the method is revealed by calculating the correlation of any pixel with respect to any other pixel taken at previous times. This "full" correlation contains time- and spatial properties such as object motion with respect to the scenario frame, object part motion with respect to other parts of the object, size and persistence information of objects. All these properties can be characteristic of content and enable discrimination and classification of various types of objects.

For an imaging system the frame rate should be chosen high enough that both the background and object correlation time are slower than the frame rate. Calculating the correlation of each pixel point with itself "back in time" (the autocorrelation time) yields then a contrast enhanced image—the object has typically a longer correlation time than vegetation in the background due to small motions caused by wind. The object (such as a pedestrian) has typically a much faster correlation time than a piece of road infrastructure or as e.g. a cardboard image of a person used for advertising.

Taking the same measurement information and calculating the correlation of pixels with their neighbors yields a typical correlation length for a specific class of objects—vegetation has a comparable small correlation length caused by small movements, persons have a much larger correlation length determined by the size of the person, road infrastructure has often the largest correlation length due to its size.

Calculating now the temporal and spatial correlations two new dimensions have been added to the measurement data: Now not only the size of an object can be used as detection tool but also the persistence time and typical motions of the object with respect to the radar system can be used.

These "full" correlation spectra contain also speed information (orthogonal to the radar system) by a clear correlation peak relating the pixels at which an object has been visible in a set of consecutive frames. Speed information of targets using imaging radars may be obtained in various ways by identifying the displacement or the size of the target when correlating a frame with previous ones.

Use of Multiple Submillimeter Bands

Due to the relatively large frequency distance between usable submillimeter bands, the radar cross section of a given obstacle will be different in different frequency bands caused by the underlying physical properties of the material of the obstacle. A human body will reflect all submillimeter waves in approximately the same way—the signal losses encountered under the human skin act as an almost perfect mirror which is independent on radiation frequency. A typical tree leaf, having a thickness of 0.5 mm . . . 1 mm, shows Fabry-Perot resonance effects where the leaf thickness projected orthogonal to the radar beam will be an odd integer multiple of half a wavelength in the material resulting in destructive interference. At other frequencies, the same leaf has a thickness which corresponds to an even integer multiple of half a wavelength in the material resulting in constructive interference. The destructive interference results in a zero radar cross section and therefore an invisible leaf, the constructive interference frequency will produce a maximum radar cross section.

In order to exploit these properties, a multi-frequency radar system can be used and the obtained images are evaluated coherently. Selecting more than one frequency band (e.g. three) each radar image obtained within a certain band is attributed a predetermined "THz color". Subsequently, all images ("THz color extracts") obtained from a specific scenario at a certain time are superimposed forming a false color image. This yields a translation of the frequency dependence of the radar response to a colored image being more suitable for image processing. Associating frequency bands with colors results in a "white" image obtained on a human body and "colorful" echoes obtained on leaves where grass leaves have a higher frequency where the first destructive interference occurs compared to tree leaves. Tree leaves are in turn higher in frequency than needles. Cardboard walls and traffic signs have a distinct non-white color that does not change fast over a large fraction of the image (looking alike an oil spot on water). Black ice layers on pavements have a typical colored slowly changing appearance too. Snow on the contrary is completely black—multiple reflections on the snow surface absorb the complete incoming radiation.

So false color submillimeterwave and THz imaging serves to discriminate objects based on their physical surface structures. The total signal amplitude obtained in all frequency bands stands finally for the radar cross section. On this dataset, discrimination parameters can be mapped based on the "THz color". For example three frequency band images can be taken. The "red" color extract is taken at 350 GHz, the "green" at 450 GHz and the "blue" at 500 GHz. The echo of a person would be common to all frequency bands. The echo of leaves and shrubs is strongly frequency dependent. Superimposing these three color images results in a false color image where the person's echo is "white" and the leaves' echo turns out to be colored. Hence multi-band imaging can be used to enhance contrast and enable classification of objects in a coherent radar system.

Submillimeter imaging radar deals with scenarios where all imaged parts are much larger than the wavelength of the used radiation. This contrasts to classical radar, where typical imaged objects have typical dimensions of some few wavelengths and thus only directed movements cause a measurable change in phase. As a consequence, Submillimeter radar images contain much more detail of the imaged object's surface properties than classical radar. On the surface of natural objects, typical structures with characteristic lengths of some millimeters are found frequently. This comprises tree bark, leaves, clothing, and reflective surfaces on traffic signs. Therefore the encountered radar cross section of a certain point on an obstacle depends much more on the used radar frequency in a narrowband way compared to a microwave radar image. Extracting and handling this information means it can be used for object or obstacle detection and classification.

As has been described, a maximum of information from a radar signal can be extracted by using variations in the periodic components such as space spectra (how large, how small is the object), low frequency spectra (how fast do small parts of the object move relative to the object), IF frequency spectra (how fast does the whole object move relative to the radar system) and color—RF frequency spectra (how does the object's reflectivity change with THz frequency).

Taking this information and taking previously taken frames into account yields a first object discrimination tool for a radar system. With such a tool, one can avoid using e.g. IF frequency spectra that have the most negative impact on system noise, to arrive at a continuous wave radar with comparable information as a Doppler radar.

Any coherent radar system is limited by its noise equivalent reflectivity difference (NERD) being more suitable in this frequency range than the noise equivalent power used in traditional radar systems. No reflectivity difference smaller than this can be detected. Reducing the NERD is crucial for enhancing a practical radar system.

There are two fundamentally different strategies to enhance the NERD:

1: Increasing the difference of the measurement signal obtained on a given reflectivity difference. By operating on a set of frequency bands instead on working on a single frequency, the difference of the received signals upon a given reflectivity difference is enhanced assuming the reflectivity is frequency independent.

2: Reducing the noise of the measurement system. Operating on a set of frequency bands instead on working on a single frequency results in the double amount of data obtained therefore allowing the object to be identified by integrating over double the amount of measurement data, effectively reducing the noise since the noise tends to cancel with more integration.

Taking not only the noise of the measurement system into account but also noise caused by rain and snow, measuring at a set of frequencies allows a reduction of this noise too—the only correlated part in the measurements is the object. Scattering and absorption by rain are strongly randomly frequency dependent.

Operating on a set of frequency bands removes effectively speckle effects. Speckle is an infamous byproduct of all coherent radar systems caused by standing waves between the transmitter, the object and the receiver. Speckle filtering usually costs a considerable amount of signal to noise ratio and dynamics of the measured signal. Multifrequency radar systems do not need any speckle filters when operating at a sufficiently large number of frequencies.

Use of Multiple Settings within the Same Submillimeter Band:

False color components can also be obtained by changing the e.g. pixel resolution, integration time and IF bin settings of the image and compare images taken with different settings. From this more accurate Doppler information is available at a few points in the image. After contour extraction, performed on a higher resolution, this velocity information is assigned to the whole object delimited by the high resolution contour.

System Components: Tx Unit

A multicolor THz radar requires a multiple set of frequency multipliers or a single multiplier set capable to generate significant output power for object illumination within a set of frequency bands. Suitable frequency bands for automotive applications are 350 GHz, 450 GHz and 515 GHz determined by atmospheric windows where water absorption is acceptably low. A continuous wave transmitter is more practical if phase locking is used since any pulse response can be calculated based on the obtained CW results using SAR techniques. In addition it is technologically much more difficult at submillimeter frequencies to retrieve phase information from pulsed transmitter data.

System Components: Rx Unit

For the receive side of a multicolor THz radar, subharmonic mixer stages are suitable. There the required LO frequencies are lower, typically by a factor of two or three and the power available to pump the mixers can be generated more easily. The separation of the different color channels can be done using Martin-Puplett diplexer stages as optical beam splitters. There almost 80% of the incoming multi frequency signal can be used compared to absorptive solutions where only 30% of the signal can be used to generate a measurement signal. By splitting the LO and RF parts into three independent units, the total THz emitted power increases by a factor of 3 which increases the system signal to noise by the square root of 3, i.e. approximately 1.7.

Other solutions are to use a sideband generator based on a single sideband upconverter on each RF source signal for each RF band. Using different sideband displacements for each RF band, only one traditional mixer is required and the various RF bands are contained in the IF signal by frequency multiplex.

Even here the Rx unit requires a multiple set of frequency multipliers or a single multiplier set capable to generate significant output power for object illumination within a set of frequency bands. Suitable frequency bands for subharmonic mixing are 175 GHz, 225 GHz and 257.5 GHz. None of these frequency bands are harmonics to each other so RF crosstalk will not be a problem.

Signal to Noise Ratio is an issue since 2D Imaging radar systems have a very hard requirement on available instantaneous IF bandwidth. (Restrictions on RF bandwidth are much more relaxed). This can only be met by simultaneously measuring at a set of THz frequencies and thereby avoiding the usage of bandwidth-increasing modulation technologies. On the other side—measuring simultaneously at a set of frequencies multiplies the amount of orthogonal data obtained and allows a further reduction in noise of the system.

Increased classification power arises since more information than in classical radar systems is gained by taking the RF frequency dependence of the object's reflectivity into account. Using a library of typical RF frequency spectra, classification of radar objects becomes possible. Especially vegetation (leaves) have a thickness of the order of a THz wavelength. Their echoes become therefore random in frequency. Any correlation analysis between several frequency channels effectively remove all echoes caused by leaves.

Increased resistance to rain and snow can be obtained by having several independent frequency channels which have only the object information as a coherent base. Any atmospheric added noise and rain/snow noise acts as a random reflectivity (in time and in frequency). Therefore the correlation function between pairs of frequency channels removes effectively snow and rain from the radar signal. Classical (civilian) radar systems have a very limited bandwidth due to legal regulations. This does not apply to submillimeter radar. The complete available RF frequency space can be used to reduce noise.

Speckle effects caused in any coherent radar system by standing waves between the transmitter, the object and the receiver antenna can be reduced. This standing wave pattern is extremely frequency dependent. Therefore working with several frequency channels can effectively remove all unwanted speckle effects and no de-speckle filtering is required.

Figure 2:
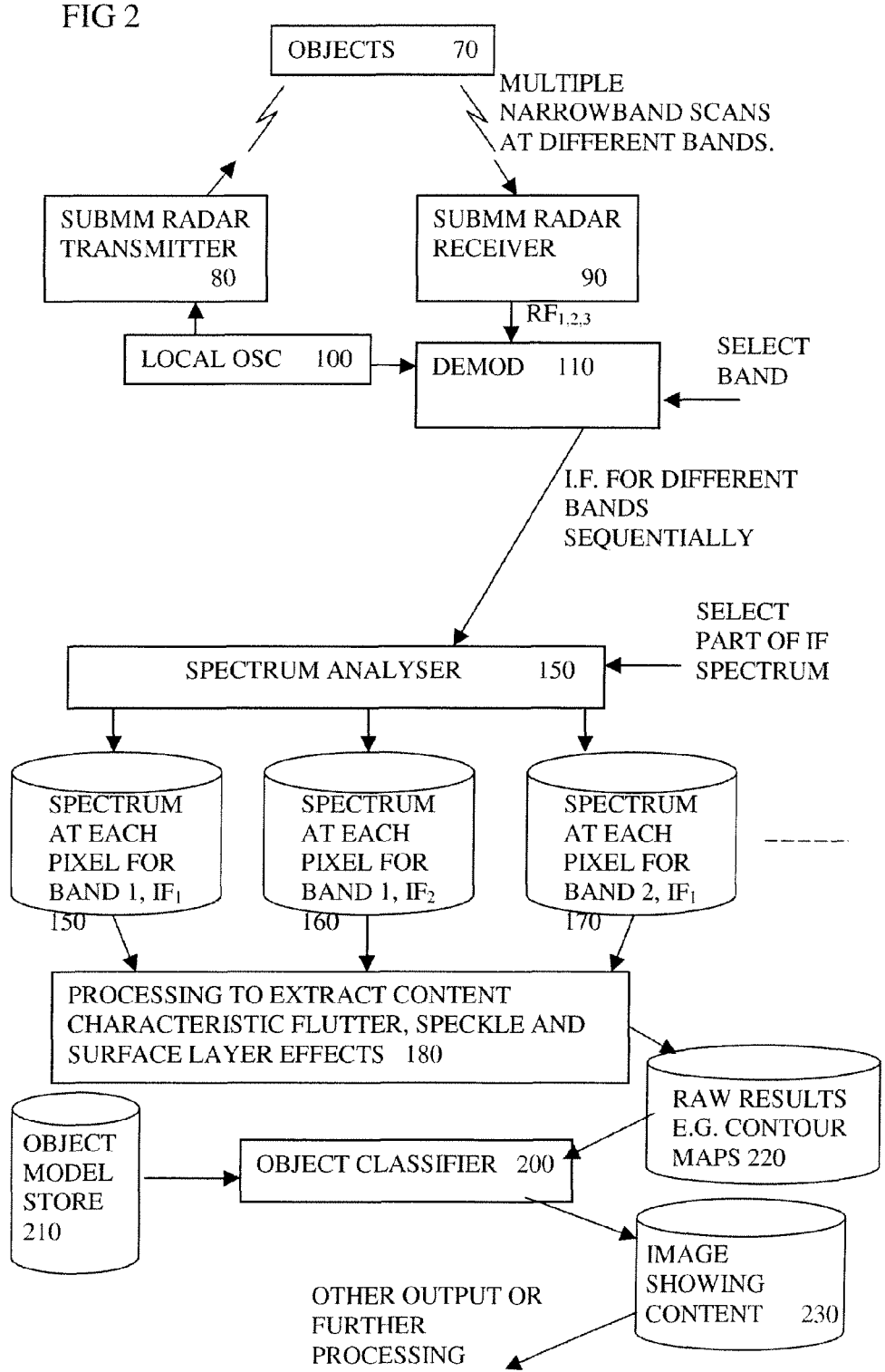

FIGS. 1 and 2, Schematic Views of Embodiments of Radar Systems

FIG. 1 shows parts of a system including transmitter and receiver parts 10, and a coherent demodulator 20 phase locked to the transmitter. This produces downconverted signals having time varying phase and amplitude components containing for a given pixel a periodic component dependent on content at that point in the field of view of the radar system. In principle the receiver and transmitter can be of any type, scanning or otherwise, scanning being 1D, 2D or 3D for example. The range can be of any range to suit the application, so automotive applications might need 100 m range or more, while applications for medical scanning or material analysis might have a range of a few meters or less than a meter. The phase locking can be carried out in various ways, and some examples will be described in more detail below.

Signal processing parts 30 can discriminate information about the content from the phase and amplitude information in the downconverted signals. The signal processing can be implemented in any way, off line or real time, in software for a general purpose processor, or in programmable or dedicated hardware, or other conventional technology to suit the cost, speed, power consumption and other criteria, of each application.

FIG. 2 shows another embodiment, similar to that of FIG. 1 but showing more detail of one way of implementing each of the parts of FIG. 1. A transmitter illuminates an object 70 and reflections are received by receiver 90. Multiple narrowband scans are made at different submillimeter wavelength bands, shown as $RF_1$, $RF_2$ and $RF_3$. A demodulator 110 is phase locked to the transmitter by means of a local oscillator 100 which feeds both parts. The demodulator can selectively demodulate the various bands and output intermediate frequency IF signals either as parallel streams or sequentially in successive lines or columns or frames for example.

A spectrum analyzer 150 outputs a number of spectra for each pixel for a selected part of the total IF band. The spectra can be of frequency, or of some other transform. Three "bins" for spectra are shown, and there can be thousands or millions of pixels, so only a few of these are shown for the sake of clarity. Spectrum 150 is for RF band 1 and IF band 1. Spectrum 160 is for RF band 1 and IF band 2. Spectrum 170 is for RF band 2 and IF band 1, and so on.

Part 180 processed these spectra to extract features characteristic of the content, caused by content flutter, speckle patterns and surface layer interference effects. Raw results in the form of multiple contour maps are stored at store 220, and can be subjected to object detection and classification by part 200. This can compare the features or threshold them according to an object model library 210. Desired content objects can be enhanced and undesired clutter can be reduced or removed. This can result in an image 230 showing content.

Figure 3:
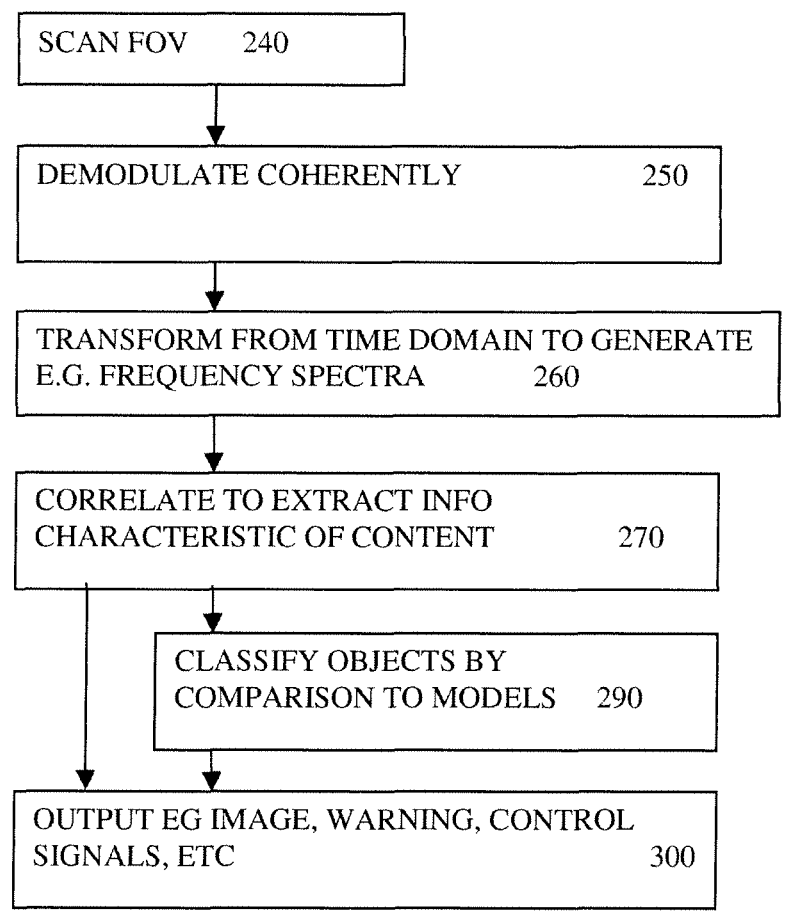
FIG. 3 shows steps according to another embodiment.

FIG. 3 shows operational steps according to another embodiment starting with a scan step 240 to scan the field of view FOV. Next the received signals are demodulated coherently at step 250. At 260, the downconverted signals are transformed from the time domain to generate frequency or similar spectra to highlight variations in the periodic components. At step 270, features characteristic of the content are extracted for example by correlations of various types. Objects can be classified at step 290 by comparison to models, and the features and classifications can be output at step 300 and used for any purpose. Some examples are an output image, a warning, or control signals to assist a driver to control a vehicle for example.

Figure 4:
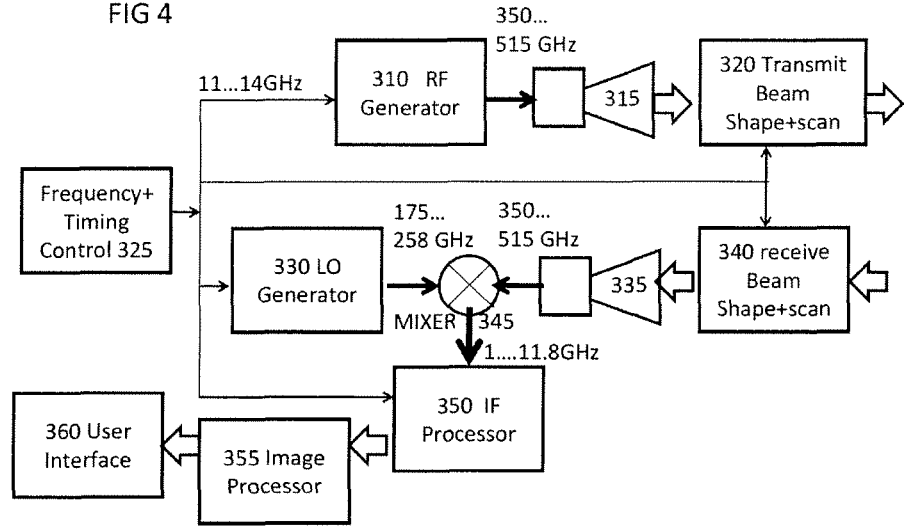
FIG. 4 shows a system view according to another embodiment.

FIG. 4: System View According to Another Embodiment,

FIG. 4 shows a submillimeter radar system having in a top line a transmit chain. This includes an RF generator 310, arranged to receive various different oscillator frequencies of the order of 11-14 GHz, for different submillimeter bands and output a 350 to 515 GHz drive signal to drive a transmitter antenna 315 which can be a horn for example or other antenna as would be known to those skilled in the art. Part 320 shapes and scans the transmit beam to cover the field of view. In principle either the transmit or receive beam could be made "staring" i.e. could be wide angle beams that are not scanned.

Part 340 shapes and scans a receive beam over the FOV. A receive antenna 335 feeds a mixer 345 to downconvert the signals received at 350 to 515 GHz. The mixer can be a subharmonic mixer, and be fed by a local oscillator signal from LO generator part 330, phase locked to the same oscillator signal used for the transmitter, by frequency and timing control part 325. The LO generator part can take in a phase locked oscillator signal at 11 to 14 GHz and can output a frequency of 175 to 258 GHz to the mixer. The mixer outputs a downconverted IF signal having a range of 0 to 11.8 GHz to an IF processor part 350. This feeds an image processor part 355, which can feed a user interface, or further processing parts.

Figure 5:
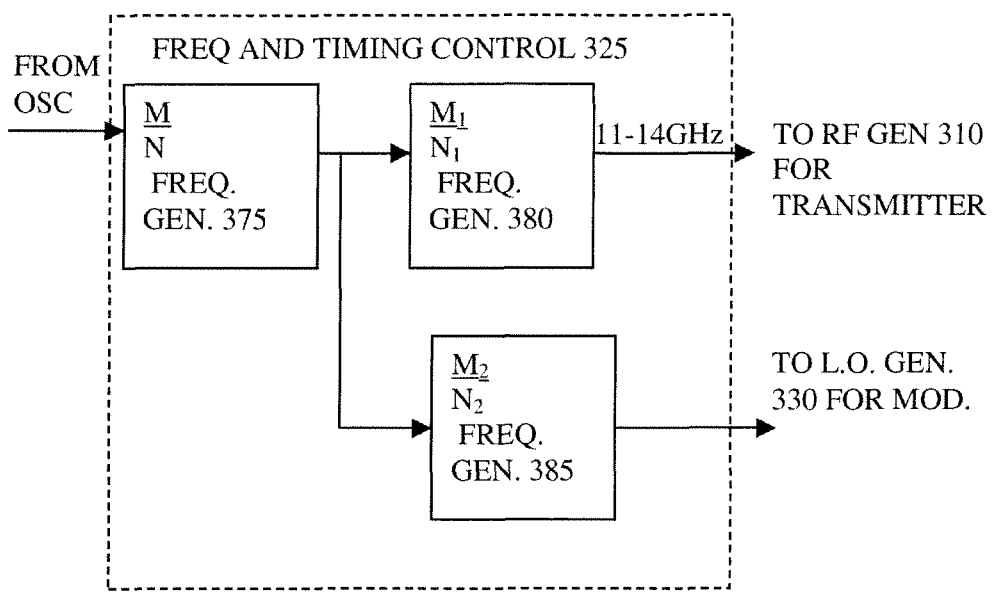
FIGS. 5, 6 and 7 show schematic views of frequency and timing control for use in the system embodiments of FIG. 1,2,3, or 4 or other embodiments.
Figure 6:
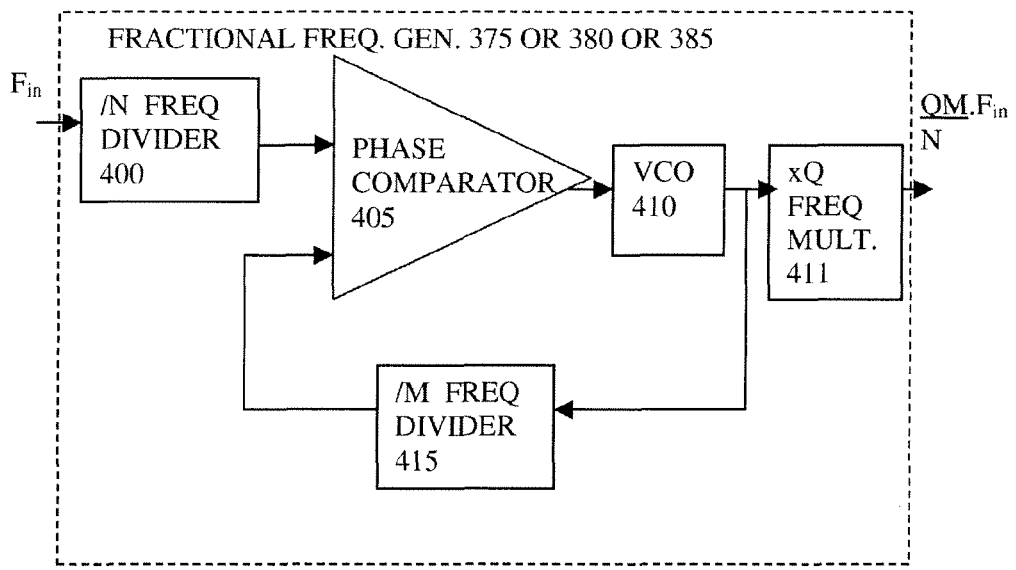
Figure 7:
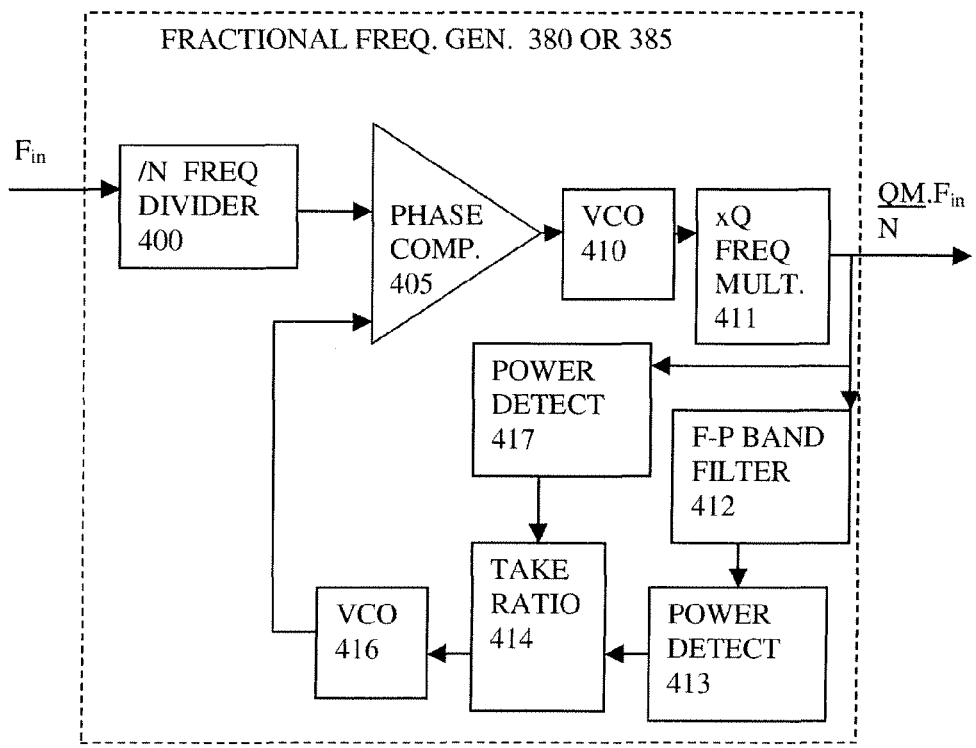

FIGS. 5, 6 and 7, Schematic Views of Frequency and Timing Control

FIG. 5 shows an example of how to implement the frequency and timing control part 325 of FIG. 4, for use in the system embodiments of FIG. 1,2,3, or 4 or other embodiments. A common or reference oscillation signal is fed from a stable source to a fractional M/N phase locked loop 375 which outputs a signal of frequency M/N of the source and in fixed phase relation with the source. This is split and one path goes to the RF generator part 310 via another phase locked loop M1/N1 380, to provide a signal of 11 to 14 GHz. The other path goes to the LO generator 330 via another phase locked loop generator M2/N2 385, to provide a signal of 11 to 14 GHz that is in fixed phase relation to the common source and to the signal provided to the transmitter, to give a coherent demodulation. The signal going to the LO generator will be at a slightly different frequency so that the difference gives the band of the output of the mixer. The difference will depend on the choices of the values N1, M1, N2, M2, the step size at which the difference may be changed depends on N and M. A control computer for the radar system not shown can be used to set or alter these values. Part 375 sets the steps at which the difference between the LO and RF frequencies can be changed. The actual RF frequency is a product of parts 375 and 380, the LO a product of parts 375 and 385. Selection of M,N yields the steps at which the frequency difference between the frequency generators' output 380 and 385 can be stepped (This M/N*Fosc replaces the usually fixed quartz reference used in PLLs allowing a more flexible and programmable RF band structure). The frequency delivered to 310 and 330 is then given by:

$M*M1/(N*N1)*Fosc$ and $M*M2/(N*N2)*Fosc.$

The frequency finally generated by the LO and RF source is thus determined by $M*M1/(N*N1)*Q*FOSC$ and $M*M2/(N*N2)*Q*FOSC$ Where the input frequency is Fosc and the factor Q is given by the fixed hardware configuration of the frequency multiplier blocks.

Choosing the factors M,N,M1,N1,M2,N2 to be pairwise prime reduces phase noise in a very efficient way since the "phase check times" are as out of synchronization as possible. In addition it avoids phantom responses caused by signal crosstalk at identical or sub- and harmonic frequencies. This feature is of specific interest since it is useful to calculate IF correlation over a large IF range where at least some of the primary frequencies (used in the above PLL) will be used as an IF frequency. Moving the primary frequencies, $M*M1/(N*N1)*Fosc$, $M*M2/(N*N2)*Q*Fosc$, $M*M1/(N*N1)*Q*Fosc$, $M*M2/(N*N2)*Fosc$ and $M/N*Fosc$ out of the IF region of analysis increases the dynamic range of the system.

FIGS. 6 and 7 show alternative embodiments for implementing phase locked loop generators 380 or 385 for use in FIG. 5. In FIG. 6 a phase locked loop is shown. A frequency divider 400 divides the frequency of the input by a factor N. This is fed to one input of a phase comparator 405. The output is a phase error which is fed to adjust a voltage controlled oscillator 410. An output of this is fed to a frequency divider 415 to divide the frequency by a factor of M, and feed it to the other input of the phase comparator. This means the output of the VCO 410 will have a steady and phase locked frequency of M/N of the input signal. M and N should be chosen to have no common factors and be prime values relative to each other so that they don't lock onto each other. Separate power supplies for different parts and as many update points equally spread over time should be provided to maintain a good phase relationship between LO and transmitter.

FIG. 7 shows an alternative with a similar arrangement of phase locked loop to that of FIG. 6 but with the frequency multiplier 411 after the VCO 410 being a part of the control loop. This multiplier multiplies the frequency by a factor Q, which may be 36 in an example. An output of the multiplier is the overall output and is also fed back to the second input of the phase comparator via a chain having a Fabry Perot "sharp" bandpass filter 412, a power detector 413, a part 414 for detecting a ratio of filtered and non filtered powers, followed by another VCO 416. A second power detector 417 is provided for detecting the power before the bandpass filter. The overall output is a phase locked signal at a frequency of QM/N of the input. This effectively incorporates some of the multiplying stages of the RF or LO generator into the fractional frequency generator. This can help reduce the phase errors introduced by the multipliers, but at the expense of more complex construction of the fractional frequency generator. In either FIG. 6 or 7, the values M and N can be programmed by a control computer, determining which part of the submillimeter bands are being used for the current image when using a single frequency radar where frames have to be taken sequentially at different RF frequencies. For a true multicolor system, several transmitters and receivers are required to obtain simultaneous images at different RF frequencies. Actual values for M and N can be programmed by the control computer of the radar system following a recipe for the measurement setting of a particular frame. The "simple" phase locked loop (PLL) structure is found in FIG. 6:

Start with the phase comparator 405: The phase comparator yields a signal proportional to the phase difference of the input signals. It yields therefore a constant voltage if the signals at the both inputs have the same frequency and therefore a constant phase difference. When the frequencies at both inputs are different, the phase difference at the inputs grows (or shrinks) linearly with time (practically, the phase difference is taken modulo 2π resulting in a sawtooth signal). Using a filter on this phase detector output, we have to ensure that if the lower input channel carries a lower (higher) frequency than the upper one, the phase detector output's mean value will be positive (negative). Feeding this signal into a voltage controlled oscillator (VCO) 410, larger (smaller) input voltages will result in a higher (lower) frequency resulting (after division by a programmable factor M using the divider 415) in an increased (decreased) frequency at the lower input of the phase detector 405 effectively correcting the frequency discrepancy found in the first place. In stable case, the frequency generated by the VCO 410 will be M times larger than the frequency found at the upper input of the phase detector 405. This upper input's frequency is by itself given by the input frequency Fin divided by N using the frequency divider 400. Therefore the output frequency will be M/N*Fin under the assumption that the PLL is locked i.e. that the phase detector's output frequency is smooth and does not contain any sawtooth trains for a longer time. The frequency at the output M/N*Fin is (using today's frequency divider technology) limited to some 10 s of GHz. In order to create submillimeterwave frequencies, we have to add a chain of fixed multipliers by a factor Q to the output of this PLL. Thereby the phase noise created by the multipliers is "out of the loop" and therefore not reduced by the PLL filters.

The alternative way of FIG. 7 is effectively a frequency locked loop (FLL) since phase is not locked directly, only indirectly through the frequency locking. Note that when using such an FLL generator scheme, the phase relation between input and output frequency is gliding slowly over a longer time. Therefore one has to provide a reference channel and has to double the downconverter stages. Then a reference phase and a measurement phase are available which difference yields the phase delay to the target. Here the output of the VCO 410 is multiplied by the factor Q in the multiplier 411. This output signal is analyzed using a sharp bandpass filter with a center outside the interval of RF frequencies of interest. Comparing the signal from the sharp bandpass with the overall output using power detector 417 the ratio between the "sharp" and "wide" or non filtered output yields a control voltage that increases with increasing RF frequency. This frequency dependent voltage is delivered to a second VCO 414 where the lower reference frequency is generated which closes the loop in a similar way as in FIG. 6. There are a set of fundamental differences: The usage of low pass filtered variables (in 413) that only depend on total absorbed power destroys the phase relation between the input and output frequencies.

Figure 8:
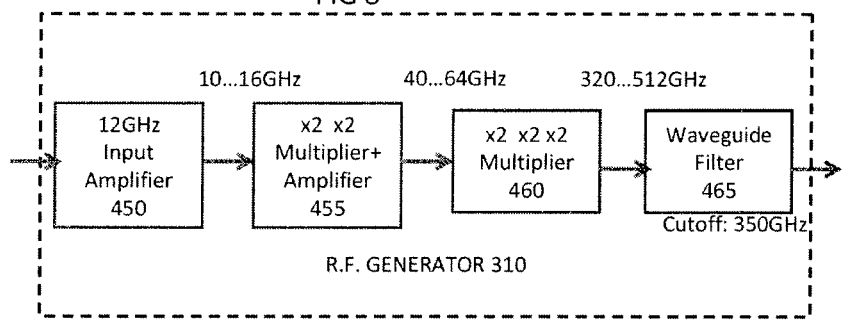
FIG. 8 shows a schematic view of an R.F. generator part for the same system embodiments.
Figure 9:
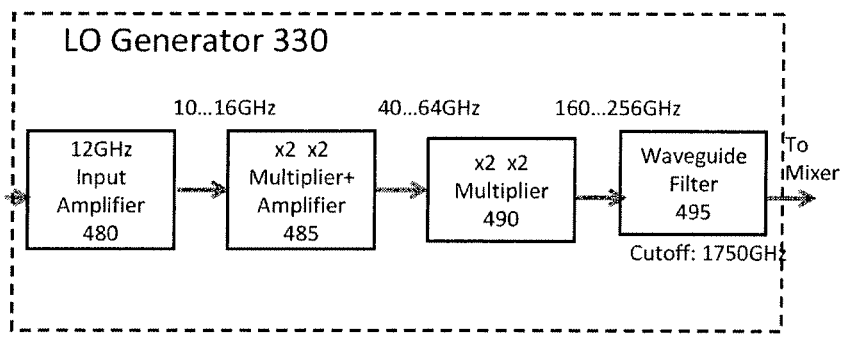
FIG. 9 shows a schematic view of an L.O. generator part for the same system embodiments.

FIGS. 8,9 R.F. Generator Part and LO Generator Part System Embodiments,

FIG. 8 shows a possible implementation of the RF generator part 310 for use in FIG. 4 or other embodiments. The phase locked oscillator signal is fed to 12 GHz input amplifier 450. This feeds a 10-16 GHz signal to series coupled x2x2 multiplier and amplifier 455 and multiplier 460 to give a further frequency multiplication of three stages of x2. Finally a waveguide filter 465 takes the 320-512 GHz signal and applies a cutoff of 350 GHz. Other values can be used for generating other submillimeter bands. FIG. 9 shows a schematic view of an L.O. generator part having corresponding parts in a similar chain, but with an end output of half the frequency which is appropriate if a a subharmonic mixer is used. The phase locked oscillator signal is fed to 12 GHz input amplifier 480. This feeds a 10-16 GHz signal to series coupled x2x2 multiplier and amplifier 485 and multiplier 490 to give a further frequency multiplication of two stages of x2. Finally a waveguide filter 495 takes the 160-256 GHz signal and applies a cutoff of 175 GHz. Other values can be used for demodulating other submillimeter bands.

Figure 10:
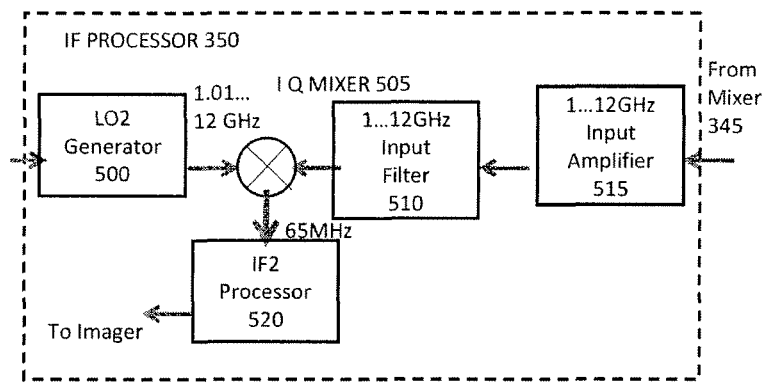
FIGS. 10 and 11 show schematic views of I.F. processing parts for the same system embodiments.
Figure 11:
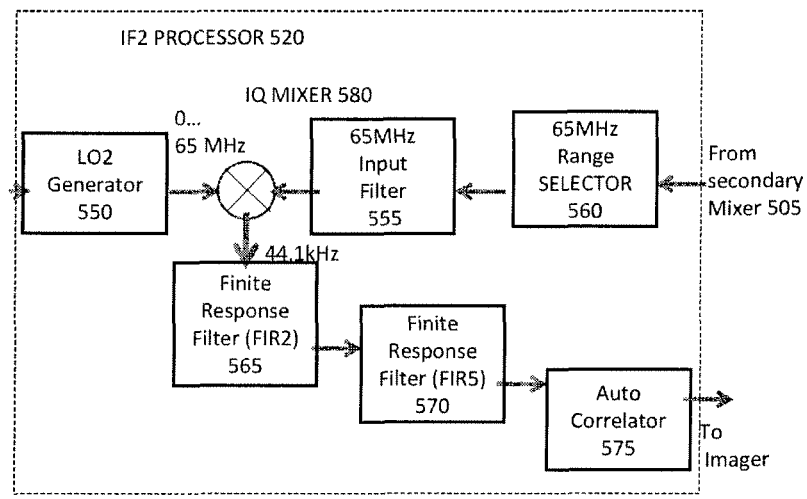

FIGS. 10 and 11, I.F. Processing Part 350 for the Same System Embodiments, FIG. 10 shows an implementation including an LO2 generator 500 feeding an IQ mixer 505. A second input of the mixer is also fed by a signal from the mixer 345 via an input amplifier 515 followed in series by an input filter 510. The output of the IQ mixer is a complex signal at 65 MHz, fed to an IF2 processor 520, which is shown in more detail in FIG. 11. The parts shown in FIGS. 10 and 11 can be implemented in the digital domain if a sampler is included at the appropriate point in the circuit.

FIG. 11 shows a possible implementation of the IF2 processor 520. The input is fed to a 65 MHz range selector 560, which then feeds another IQ mixer 580 via an input filter 555. The other input to this mixer is from an LO2 generator 550, providing a signal having a 0-65 MHz range. The mixer outputs a signal of frequency range 44.1 kHz to a finite response filter 565 used for noise reduction by decimation and smoothing. An example of a suitable integrated circuit is the Analog Devices AD 6620 chip. This feeds a further finite response filter 570 required to achieve a complete quadrature demodulation of the incoming signal, which in turn feeds an auto correlator 575 used for data decimation and noise suppression. This scheme is quite classical and used in e.g. GSM mobile stations. The purpose of the data decimation is to increase the effective number of bits provided by the AD converter. Using this triple filter scheme allows a physically 12 bit converter to generate 22 bit complex data. The third of these FIR filters can be used in addition to de-correlate upper and lower sideband signals as soon as these sidebands are correlated (as in micromotion of vegetation echoes which have zero net frequency displacement).

FIGS. 12 and 13: Implementation of Image Processing Parts

FIGS. 12 and 13 show parts of an implementation of the image processor 355 for the system of FIG. 4 or other embodiments. The raw IF signals from the IF2 processor are a sequence of frequency domain signals representing a spectrum at each pixel in sequence. Input to the frame generator is also another sequence of signals relating time to the position of all (receiver and transmitter) antenna beams. The frame generator uses this relation between antenna beam position and time to assign beam position data to the stream of IF data effectively generating a (2+n)D image (under the assumption that the beam position sweep a 2D area over time). N stands then for the added number of dimensions: E.g. n=1 indicates that each image pixel consists of an IF spectrum, n=2 results when (in addition to each pixel being an IF spectrum), there has been a 1D sweep of the illumination source, n=3 is obtained when we use a 2D sweep of the illumination or an 1D sweep together with a RF frequency sweep, n=4 results of the usage of a 2D illumination sweep together with a RF frequency sweep. We can change all or a part of the following parameters:

Receive sweep (i.e. the "image") being the primary dimensions of the frame
    Transmit sweep (i.e. the "illumination")
    RF frequency sweep
    IF frequency bins (read out using parallel receive signal processors)
    Polarization sweep
    Antenna beam pattern sweep (i.e. the "focal depth")

Such a higher dimensional data structure is considered a "frame". The subsequent analysis relies on this unified description of a "frame".

Starting out with this (2+n)D frame of complex data, we provide a set of filters that generate scalar, positive definite 2D images where each pixel is given by the result of a certain "filter function" or "cost function" applied to any subset of additional dimensions or to any subset of data found in any dimension. Intuitively there are a set of typical "cost functions" that are grouped into function groups:

Thus the (2+n)D frame generator fills the relevant locations in the frame memories 610 with spectral information for each pixel. Each spectrum is determined over a time window of a certain number of frames, and this time window slides in time by one frame time for determining the spectra for the next frame. The frame memory is accessed by a number of correlating devices as will now be explained allowing filter functions to access temporal tendencies too.

1. An IF correlator 615 looks for Doppler shifts in the IF which will indicate motion of the object in the axis of the beam, provided the period of any motion is slower than the frame interval. This involves an auto correlation with spectra of the same pixel from previous frames to determine a frequency of a peak in the spectrum and determine if the peak is moving with a particular frequency characteristic of content flutter. This provides an output which is passed via an adaptive filter 635 to build up a false color image once all pixels are processed, to show areas of the image which have a common characteristic flutter frequency.

2, A spatial correlation is carried out by pixel correlator 620 using a moving 64×64 grid of pixels around a current pixel, following established image filtering practice, though in this case it is spatial filtering of spectra at each pixel, not merely amplitude information for each pixel. This is followed by adaptive filter 640 to build up another false color image once all pixels are processed, to show areas of the image which have a common and characteristic spatial variation in spectra. This data field allows thus comparison between neighboring pixels and as a pixel projection area provides information about the vicinity of each pixel or group of pixels of the frame. Such data is required for contour and object extraction similar to a visual cortex in the human visual system giving rise to its nickname "retina".

3. A temporal correlation is provided by frame correlation part 625, which looks for temporal repeats or patterns as the spectrum for a given pixel changes over time. This is followed by an adaptive filter 645 to build up another false color image once all pixels are processed, to show areas of the image which have a common and characteristic temporal variation in spectra. This is summarized as a "memory" like function that yields typical persistence times that can be found pixel correlation times at each pixel. This filter yields speckle intensity and periodicity and is typically evaluated using spectral and quasispectral methods. The quasispectral contents of a pixel yields therefore leaf flutter and micromotion signals. Such an operation requires the correlation between previous frames and the actual ones giving rise to the nickname "memory" for this unit. The temporal variations found when comparing various frames in time are caused by speckle which tend to change at a rate specific to an object at a given distance and with a specific speed and will thus give rise to a correlation peak within a given range of time intervals. Other sources for time dependent variations are interference fringes from a thin layer such as a leaf, which will flutter in the wind at a given period. Other correlations can be carried out by extrinsic frame correlator 630 and are summarized by the term "3D camera" and can include correlations between frames using different submillimeter bands, different parts of the IF range, different illumination depths or illumination orientations, if the transmitter can achieve this, and different focal positions for example. This is followed by an adaptive filter 650 to build up another false color image once all pixels are processed, to show areas of the image which have a common and characteristic variation in spectra with any of these factors.

In FIG. 13, a part B of this possible implementation of the image processor is shown. It shows various ways of using the various false color 2D images. A contour extraction part 665 is fed by a number of the false color images, via weighing functions 660. The weighted false color images can be overlaid or combined, and thresholds or other filtering applied to output enhanced 2D images, or simply provide metadata to add to the images. For example for contour extraction most weight might be given to the "retina" image, and some weight to the Doppler image, and less weight to the memory and 3-D images. The processing applied by the contour extraction can be made dependent on input from a content characteristic library which could provide known shapes as templates to enable gaps to be filled in or shapes to be identified for example. A region extraction part 670 can operate in a similar way but could have heavy weighting from the Doppler image to identify objects such as vehicles for example, and might use information from the content characteristics library to identify surface vibrations and shape for example. An environmental parameter extraction part 675 could have weighting appropriate to identify rain and compensate for it in other images, or identify ice on a road surface for example.

A distance extraction part 680 is also shown which might combine information from various ways of determining distance such as size of identifiable objects, comparing responses at different focal positions of the receive beam, to determine where the focus is sharpest, and ranging by measuring time of flight by correlating a noise modulation applied to the transmitter and detectable in the received signals. The noise modulation could be randomized jumping between different submillimeter bands. This would be useful to avoid interference between similar radars on different vehicles in heavy traffic for example.

On the other side, the frequency contents of the IF channel can be deliberately manipulated in some embodiments by applying other low frequency sources (e.g. ultrasound) to the target resulting in generation of sidebands on the RF signal which in its turn are visible as a frequency shift in the IF channel. Such embodiments are useful to provide analysis of vibrations of structures for example to detect hidden cracks. The use of coherent demodulation gives better depth resolution and effectively provides holographic data. This can enable reconstruction of any RF modulation.

By use of these correlations more information can be generated than by just adding the false colors. For example: fast changing items (leaves, shrubs) yield "white noise" in the colored image, any other object with a repeated, stable phase relation over an area of the object will have a stable, non changing color, having a color saturation which indicates its phase stability.

By false-color pairing partial images that have been taken within a correlation time (at which the object had no time to change) and by pairing partial images taken at larger correlation times, a "persistence" or "correlation time" parameter is extracted that is characteristic for the specific objects imaged.

For an automotive radar application, it is useful to provide images suitable for computer-based pattern extraction and not necessarily optimized for a human observer. Therefore the concept "false-color" (that has been used to demonstrate the capabilities) is not limited to three primary colors but to correlate a set of (potentially >10) different partial images taken at the same time and at certain time offsets.

FIG. 14: Alternative Embodiment Using Off-Line I.F. Processing and Image Processing, This figure shows similar parts to those of FIG. 4 and reference is made to the corresponding description above. In this case the IF and image processing parts are replaced by a data acquisition part 700, which feeds a data storage part 710. An off line image processing part 755 can carry out similar functions to those of the IF processing and image processing parts of FIG. 4.

FIGS. 15 and 16 Beam Shape and Scan Parts for Embodiments of the Radar System

FIG. 15 shows parts for mechanical beam scanning for the transmitter. This could be replaced by electronic beam scanning. A first off axis parabolic mirror 800 is followed in the transmit beam path by a rotating plane mirror 810 to provide x-deflection (also known as phi-deflection in spherical coordinates). This is followed by an undulating cylindrical mirror 820 to give y deflection (also known as theta deflection in spherical coordinates), followed by a fixed secondary paraboloid mirror 830 to provide an elliptical beam. A timing control part 840 is provided to control the moving parts. Focus control is provided by the first mirror. If multiple beams are provided then they could be phase linked to have the effect of one steerable beam. A typical beam diameter is around 10 cm.

FIG. 16 shows similar parts for receive beam scanning. The first element in the beam path is the fixed secondary paraboloid 890, followed by the undulating plane mirror 870 to give y-deflection. This is followed by the rotating plane mirror 860 to give x-deflection, then the off axis parabolic mirror 850 movable to provide focus control. Again a timing control part 900 is provided to control and synchronise the movements of the three moving parts.

FIGS. 17 to 23 How Content Flutter and Speckle Effects can Provide Detectable Information in the Spectra of the Received Signals.

Figure 17:
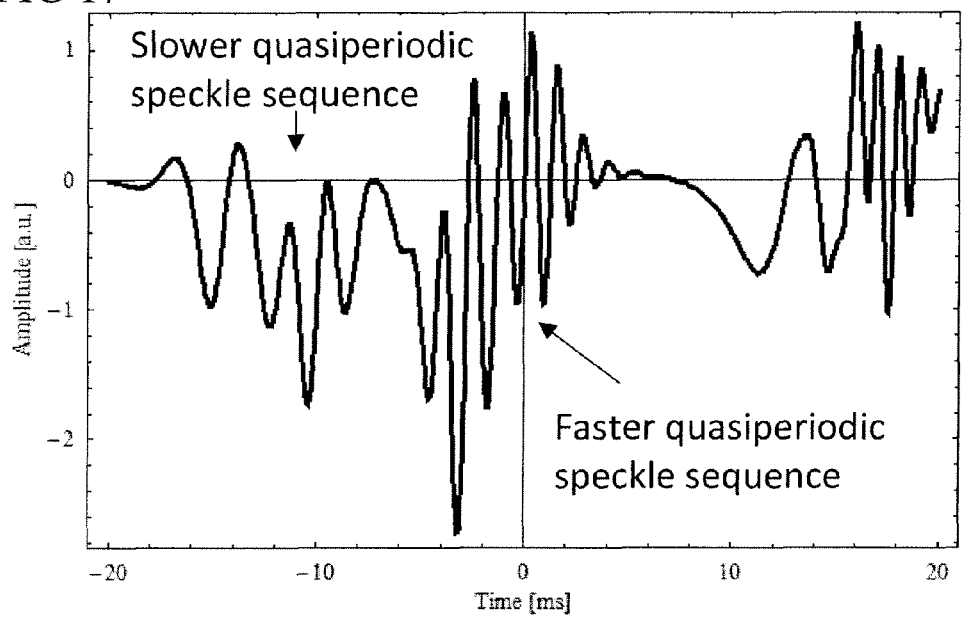
FIGS. 17 to 23 show graphs to show how content flutter and speckle effects can provide detectable information in the spectra of the received signals.

FIG. 17 shows a graphical view of an example of a temporal signature of the IF signal of a given pixel when pointing at a given object. The temporal signature contains sequences where the IF amplitude changes in a quasiperiodic manner caused by changes in the runtime of the radar signals. Since there are standing waves between transmitter and receiver antennas, a change in runtime of half a wavelength causes the standing wave to change from a constructive interference case to a destructive interference case. Any object with a constant velocity with respect to the radar system will cause periodic speckle. Objects with a more random velocity will cause quasiperiodic speckles where the temporal length of the quasiperiodic sequence depends on the rate of change of the velocity. A first part of the signature shows the effect of a slower velocity object, and a second part shows the effect of a faster velocity object.

Figure 18:
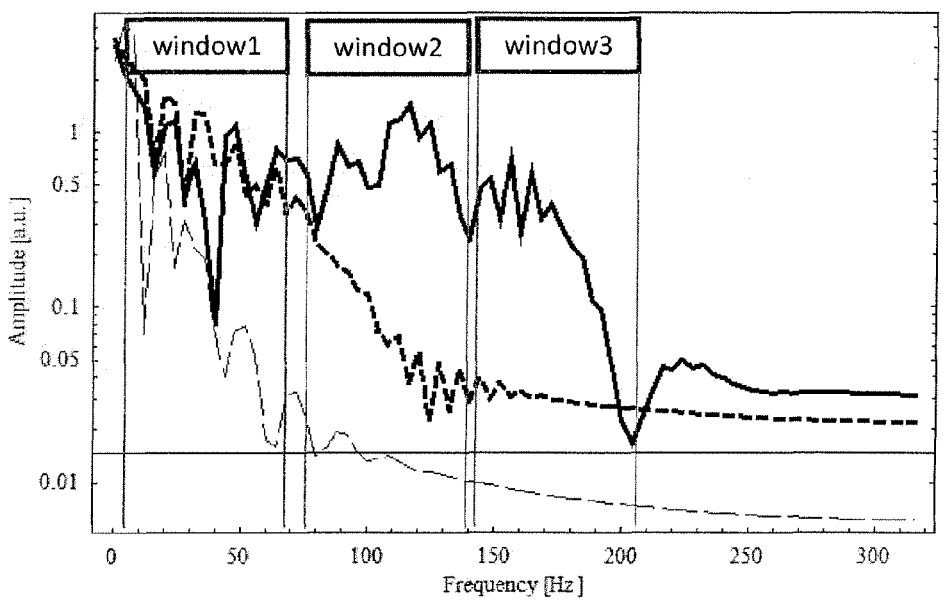
Figure 19:
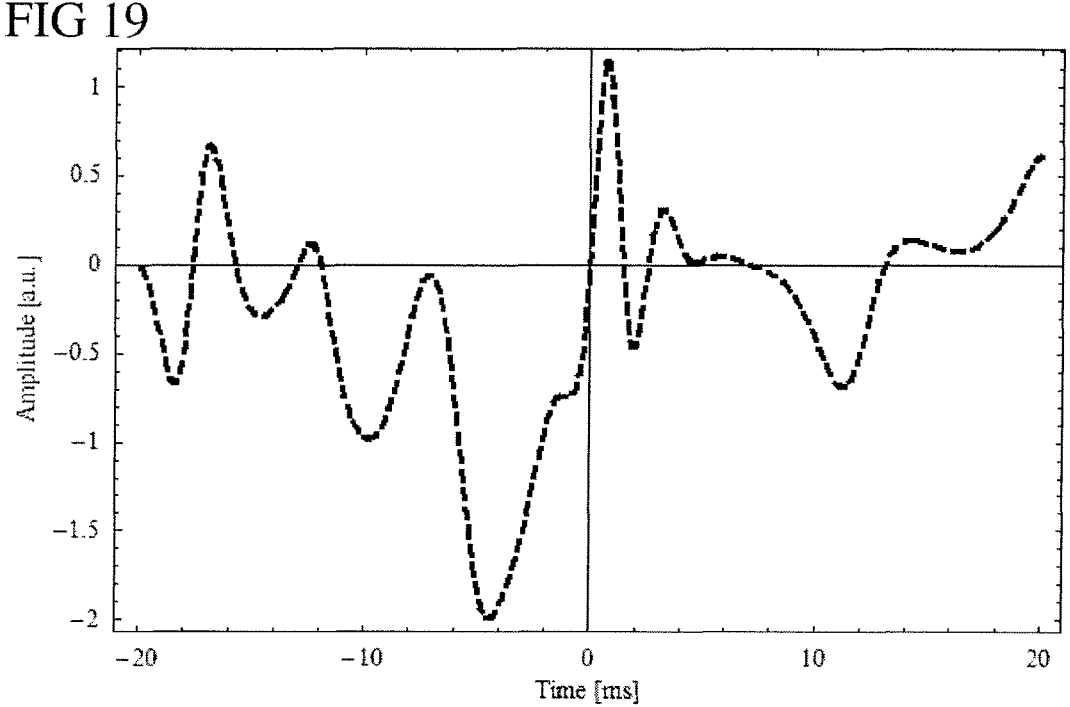
Figure 20:
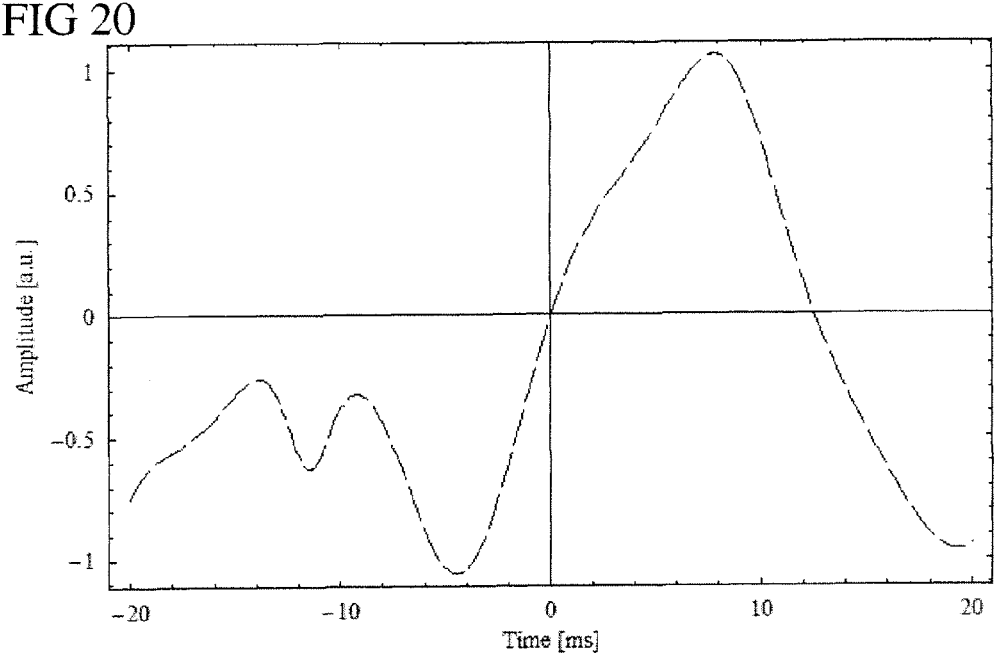

FIG. 18 shows a graphical view of the frequency contents IF signal of a given pixel when pointing at selected types of targets indicating windows of frequencies used for object classification. Window 1 is used for background removal, window 2 for Identification of interesting targets and window 3 serves for vegetation removal purposes.

The thick, solid curve shows the frequency contents of the IF obtained for a rapidly moving target (e.g. vegetation) The thick, dashed curve shows the frequency contents of the IF obtained for a slowly moving target (e.g. pedestrian). This represents the spectrum of the temporal signal shown in FIG. 19. The thin, dashed curve shows the frequency contents of the IF obtained for a signal returning from the fixed background. This represents a frequency spectrum of the temporal signal shown in FIG. 20.

Table 1 shows a table of mean values of the absolute of the FFT taken over the windows represented in FIG. 18. The values in brackets are relative to the contents in Window 1.

TABLE 1

| item | Contents in Window 1 | Contents in Window 2 | Contents in Window 3 |
|---|---|---|---|
| vegetation | 1.1318 | 0.614 (0.543) | 0.705 (0.623) |
| pedestrian | 0.364 | 0.310 (0.857) | 0.336 (0.927) |
| background | 0.987 | 0.003 (0.003) | 0.001 (0.001) |
| Frequency Limits [Hz] | 50 . . . 120 | 100 . . . 170 | 150 . . . 200 |

This table will now be explained:

The fast moving object has of course the largest contribution in Window 3. The background has nothing there and the slow moving object is considerably smaller there. Taking into account the relative values, the windows 2 and 3 show a similar behaviour. For vegetation, and for the pedestrian, windows 1 and 2 behave similarly. For the background not much can be found in windows 2 and 3.

Figure 21:
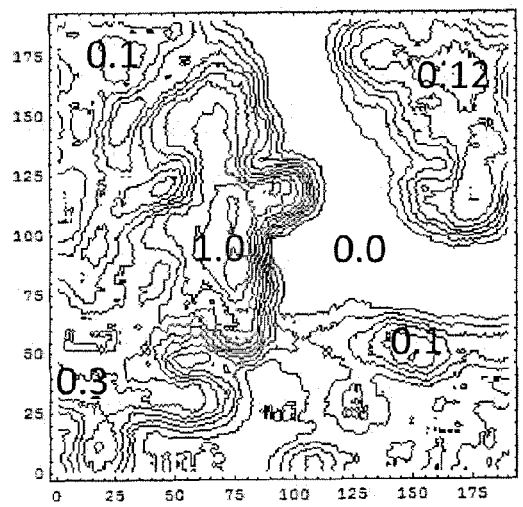
Figure 22:
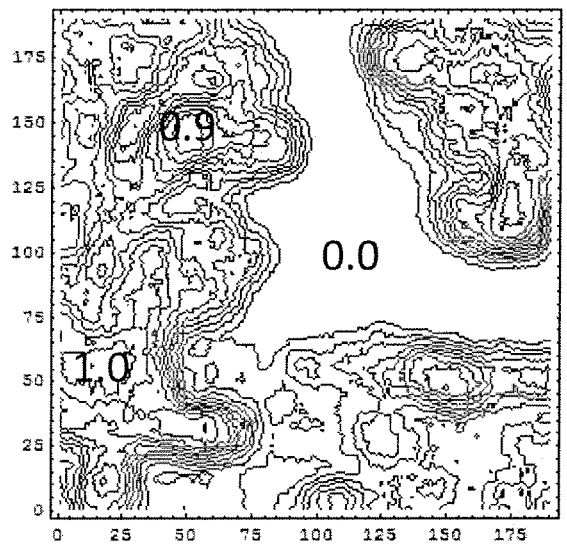
Figure 23:
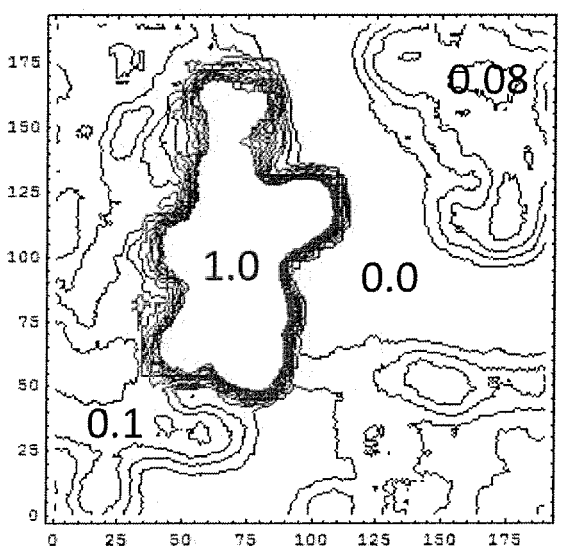

FIG. 21 shows a plot of raw amplitude data for all pixels of a frame, for comparison with the processed images shown in FIGS. 22 and 23. It is these mean values obtained in the frequency windows for each pixel that can be plotted for all pixels to obtain the processed images as shown in FIGS. 22 and 23. FIG. 22 shows a processed image corresponding to window 3 which highlights the faster moving vegetation as explained above with respect to FIG. 18. FIG. 23 shows a processed image corresponding to a difference between windows 2 and 3 which highlights the pedestrian and minimises the fast moving vegetation and static background, since the pedestrian has the greatest difference between windows 2 and 3 as shown in FIG. 18.

FIG. 22 depicts the amplitude in the fastest frequency window (#3) of the same scenario as FIG. 21. FIG. 23 shows the difference between the slower (#2) and fastest frequency window (#3) weighed by suitable constants. All plots are isoline plots normalized between maximum and minimum of the plot. One traversed isoline corresponds to a change of 1% of the value span.

Other processed images can be obtained to distinguish features, for example an image of an enhanced "slow" component can be obtained by multiplying the intensity by a factor of 3 or some other factor.

Figure 24:
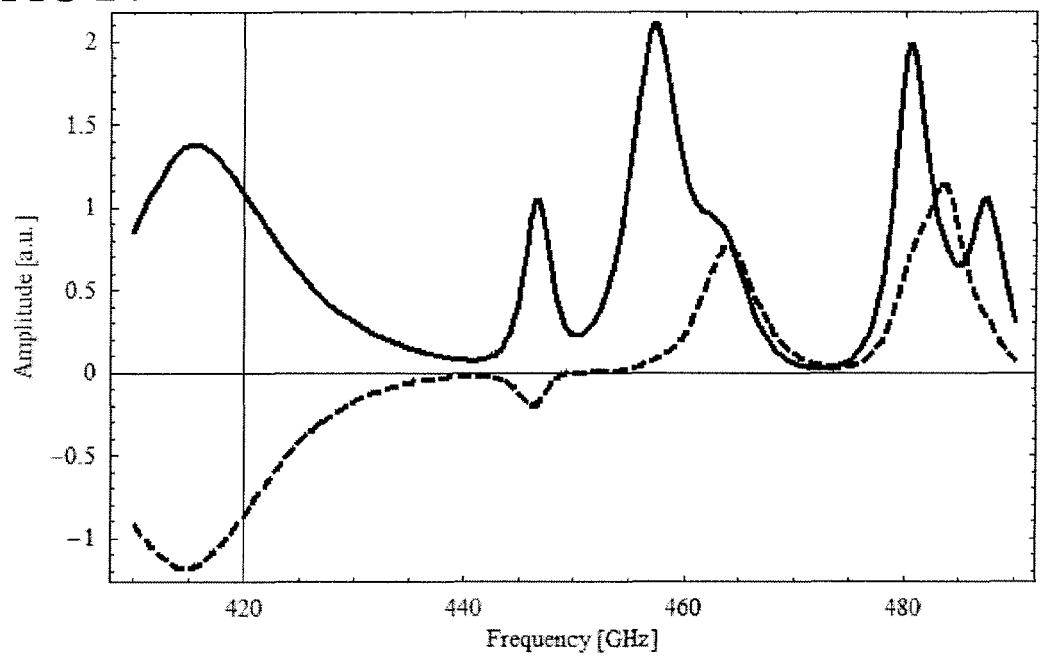
FIGS. 24 and 25 show graphs to indicate detectable interference effects in received RF signals.
Figure 25:
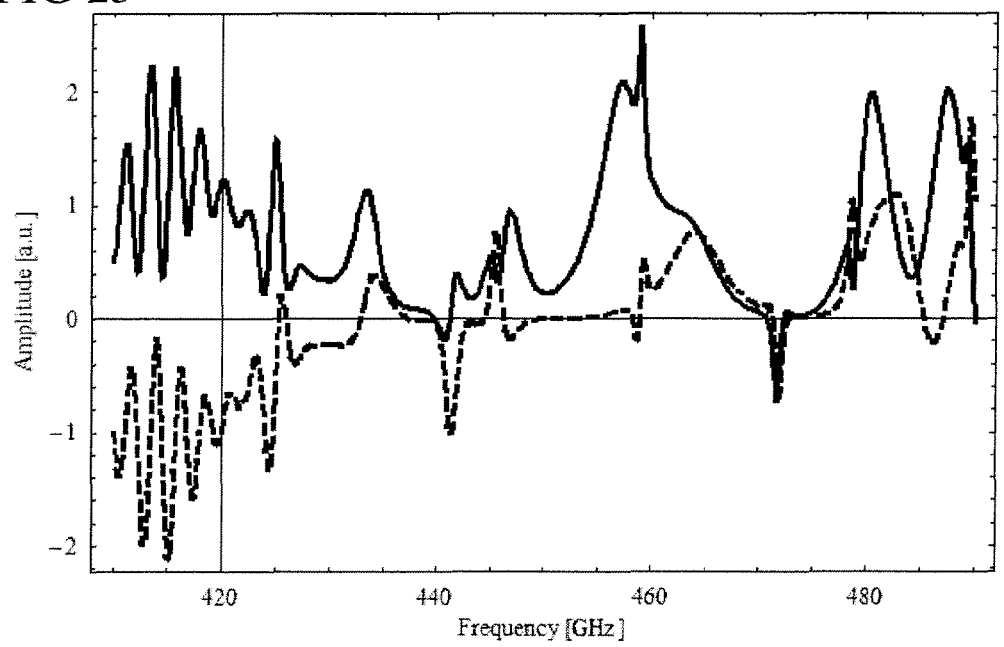

FIGS. 24 and 25, Thin Dielectric Layers Causing Fabry Perot Effects in RF

FIGS. 24 and 25 show how the presence of thin dielectric layers affects the RF frequency dependency of the radar signal. These figures show plots of amplitude versus RF frequency to show Fabry Perot effects in RF for a metal. In these figures the solid line represents a real part of the reflected power. The dashed line represents an imaginary part of the reflected power.

FIG. 24 shows a grazing reflection (at a low angle of incidence, nearly parallel to the surface) from the metal surface without a coating. FIG. 25 shows a grazing reflection of a similar metal surface now coated with a 2 mm thick plastic layer, so that the beam path length through the layer is approximately 60 mm. From a comparison of the graphs, it can be seen that the response in FIG. 25 differs primarily in the large and periodic variations at the left hand side, which correspond to the constructive and destructive interference which varies with frequency. Hence this can be used to distinguish that the object has a surface layer of a given thickness, or if the thickness is known, information about the angle of incidence can be derived. The frequency range where the periodic variation appears may vary owing to secondary effects, but the presence of the periodic variations is characteristic of the surface layer.

The signal processor of the present invention may be implemented as hardware, computer software, or combinations of both. The signal processor may include a general purpose processor, an embedded processor, an application specific integrated circuit (ASIC), a field programmable gate array (FPGA) or other programmable logic device, discrete gate or transistor logic, discrete hardware components, or any combination designed to perform the functions described herein. A signal processor may also be implemented as a combination of computing devices, e.g., a combination of an FPGA and a microprocessor, a plurality of microprocessors, one or more microprocessors in conjunction with an FPGA, or any other such configuration.

The present invention also includes a computer program product which provides the functionality of any of the methods according to the present invention when executed on a computing device. Software according to the present invention, when executed on a processing engine, can contain code segments that provide a method of using a submillimeter wavelength active radar system, the method being for use with illuminating a field of view using a transmitter, the software being adapted to allow receipt of signals from the field of view, and for downconverting the signals coherently using a demodulator phase locked to the transmitter so that the downconverted signals have a periodic component having phase and amplitude information which is dependent on content in the field of view. The software may be further adapted to process, when executed, the downconverted signals to discriminate information about the content from the phase and amplitude information in the signals.

The signals can have a periodic component with phase and amplitude information which is dependent on content in a field of view of the radar system, and the software may be adapted for downconverting the signals using a local oscillator signal phase locked to a transmitter of the radar system, and for discriminating information about the content from the phase and amplitude information in the signals.

The software may be adapted so that discriminating the information is by applying one or more operators to the received signal to extract spatial or temporal features of spectra of the received signal.

Other variations can be envisaged within the scope of the claims.

The invention claimed is:

1. A processor for a submillimeter wavelength active radar system having a field of view, the processor being arranged to process a signal received from the field of view and downconverted by the radar system, the downconverted signal corresponding to a given pixel of the field of view having time varying amplitude and phase components which have a periodic component which is dependent on content at the given pixel of the field of view, and the processor being arranged to discriminate information about the content from the periodic component, wherein the information discriminated from the periodic component includes at least one effect selected from content flutter, speckle patterns characteristic of the content, and interference effects from thin layers causing radio frequency dependent periodicity.

2. The processor of claim 1, the downconverted signal being an IF signal, and the processor being arranged to analyse two or more regions of the IF spectrum separately.

3. The processor of claim 1, the downconverted signal comprising separate signals received at a plurality of different submillimeter frequencies, and the processor being arranged to analyse separately the downconverted signals corresponding to the different submillimeter frequencies.

4. The processor of claim 1 being configured to detect and classify objects in the content using the information discriminated from the periodic component.

5. The processor of claim 1, further having a part for relating parts of the received signal to corresponding locations in the field of view.

6. The processor of claim 1, further having a part for discriminating the information by applying one or more operators to the components of the downconverted signal to extract spatial or temporal features of the components.

7. The processor of claim 6, the one or more operators comprising an operator for extracting features having a dependency on at least one of a sub millimeter band, an illumination orientation, a focal position of the receiver, and a polarization.

8. A sub millimeter wavelength radar system comprising the processor according to claim 1, and having a transmitter for illuminating a field of view, a receiver for receiving signals from the field of view, and a demodulator, the demodulator being phase locked to the transmitter.

9. A vehicle having the radar system of claim 7, further comprising an output system for using the discriminated information.

10. A method of using a submillimeter wavelength active radar system, the method comprising:
    illuminating a field of view using a transmitter;
    receiving a signal from the field of view;
    downconverting the signal coherently using a demodulator phase locked to the transmitter so that the downconverted signal corresponding to a given pixel of the field of view has time varying amplitude and phase components which have a periodic component which is dependent on content at the given pixel in the field of view; and
    processing the downconverted signal to discriminate information about the content from the periodic component, wherein discriminating the information includes applying one or more operators to the components of the downconverted signal to extract spatial or temporal features of the components.

11. A method of processing a signal from a receiver of a submillimeter radar system, the signal being dependent on content in a field of view of the radar system, the method comprising:
    downconverting the signal using a local oscillator signal phase locked to a transmitter of the radar system so that the downconverted signal corresponding to a given pixel of the field of view has time varying amplitude and phase components which have a periodic component; and
    discriminating information about the content from the periodic component, wherein the information discriminated includes at least one effect selected from content flutter, speckle patterns characteristic of the content, and interference effects from thin layers in the content causing radio frequency dependent periodicity.

12. The method of claim 11, further comprising discriminating the information by applying one or more operators to the received signal to extract spatial or temporal features of spectra of the received signal.

13. A computer readable medium having a stored program thereon which when executed by a computer causes the computer to carry out the steps of claim 11.

\* \* \* \* \*